United States Patent
Garthwaite

(10) Patent No.: US 7,024,437 B2
(45) Date of Patent: Apr. 4, 2006

(54) BETTER PLACEMENT OF OBJECTS REACHABLE FROM SPECIAL OBJECTS DURING COLLECTION BASED ON THE TRAIN ALGORITHM

(75) Inventor: Alexander T. Garthwaite, Beverly, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 492 days.

(21) Appl. No.: 10/313,831

(22) Filed: Dec. 6, 2002

(65) Prior Publication Data

US 2004/0111450 A1 Jun. 10, 2004

(51) Int. Cl.
*G06F 12/00* (2006.01)
*G06F 17/30* (2006.01)

(52) U.S. Cl. ............... 707/206; 707/103 R; 707/104.1; 707/205; 711/159; 711/173; 717/140; 717/148

(58) Field of Classification Search ............... 707/10, 707/101, 102, 104.1, 205, 206, 103 R, 103 X, 707/103 Y; 711/153, 154, 159, 173; 717/114, 717/116, 140, 148

See application file for complete search history.

(56) References Cited

U.S. PATENT DOCUMENTS

| | | | | |
|---|---|---|---|---|
| 5,873,105 | A * | 2/1999 | Tremblay et al. | 707/206 |
| 5,903,900 | A * | 5/1999 | Knippel et al. | 707/206 |
| 6,047,125 | A * | 4/2000 | Agesen et al. | 717/148 |
| 6,148,310 | A * | 11/2000 | Azagury et al. | 707/206 |
| 6,243,720 | B1 * | 6/2001 | Munter et al. | 707/206 |
| 6,381,738 | B1 * | 4/2002 | Choi et al. | 717/140 |
| 6,457,019 | B1 * | 9/2002 | Sexton et al. | 707/103 R |
| 6,757,890 | B1 * | 6/2004 | Wallman | 717/148 |
| 6,820,101 | B1 * | 11/2004 | Wallman | 707/206 |

OTHER PUBLICATIONS

Appleby Karen: "Garbage Collection for Prolog Based on WAM", Communication of the ACM, Jun. 1, 1998, vol. 31, Issue 6, pp. 1-20.*

Robert Courts: "Improving Locality of Reference in a Garbage Collecting Memory Management System", Communication of the ACM, Sep. 1988, vol. 31, No. 9, pp. 1128-1138.*

Richard L. Hudson et al.: "Incremental Collection of Mature Objects" Lecture Notes In Computer Science; vol. 637 archive Proceedings of the International Workshop on Memory Management, 19992, ISBN: 3-540-55940-X, pp. 388-403.*

(Continued)

*Primary Examiner*—Jeffrey Gaffin
*Assistant Examiner*—Jacques Veillard
(74) *Attorney, Agent, or Firm*—Kudirka & Jobse, LLP

(57) ABSTRACT

A garbage collector that operates in accordance with the train algorithm designates some cars as "special" cars into each of which at most a single object is allowed. When an object in a car being collected is referred to by a reference located in such a special car, the collector may depart from the conventional evacuation approach of placing the evacuated object into the train containing the reference referring to it. If the reference is located in an object referred to from a train younger than the train in which the reference is located, the referred-to object in the car being collected is not evacuated to the train that contains the reference to it. Instead, it is evacuated to the train from which the object containing that reference is referred to.

22 Claims, 29 Drawing Sheets

OTHER PUBLICATIONS

Jones and Lins, "Garbage Collection: Algorithms for Automatic Dynamic Memory Management," 1996, pp. 165-179, Wiley, New York.

Paul Wilson, "Uniprocessor Garbage Collection Techniques," Technical Report, University of Texas, 1994.

Hudson and Moss, "Incremental Collection of Mature Objects," Proceedings of International Workshop on Memory Management, 1992, Springer-Verlag.

Grarup and Seligmann, "Incremental Mature Garbage Collection," M.Sc. Thesis, Available at http://www.daimi.au.dk/~jacobse/Papers/.

Clark and Mason, "Compacting Garbage Collection can be Fast and Simple," Software-Practice and Experience, Feb. 1996, pp. 177-194, vol. 26, No. 2.

Henry Baker, "List Processing in Real Time on a Serial Computer," Communications of the ACM 21, 4, Apr. 1978, pp. 280-294.

Appel, Ellis, and Li, "Real-time Concurrent Collection on Stock Multiprocessors," ACM SIGPLAN Notices, 1988.

Rodney A. Brooks, "Trading Data Space for Reduced Time and Code Space in Real-Time Garbage Collection on Stock Hardware," Proceedings of the 1984 ACM Symposium on Lisp and Functional Programming, pp. 108-113, Aug. 1984. Austin, Texas.

Herlihy and Moss, "Lock-Free Garbage Collection for Multiprocessors," ACM SPAA, 1991, pp. 229-236.

Bacon, Attanasio, Lee, Rajan, and Smith, "Java without the Coffee Breaks: A Nonintrusive Multiprocessor Garbage Collector," SIGPLAN Conference on Programming Language Design and Implementation, Snowbird, Utah, Jun. 2001.

James Stamos, "Static Grouping of Small Objects to Enhance Performance of a Paged Virtual Memory," ACM Transactions on Computer Systems, vol. 2, No. 2, pp. 155-180, May 1984.

David A. Moon, "Garbage Collection in a Large Lisp System," Conference Record of the 1984 ACM Symposium on LISP and Functional Programming, Austin, Texas, Aug. 1984, pp. 235-246.

Robert Courts, "Improving Locality of Reference in a Garbage-Collecting Memory Management System," Communications of the ACM, Sep. 1988, pp. 1128-1138, vol. 31, No. 9.

Wilson, Lam, and Moher, "Effective Static-Graph Reorganization to Improve Locality in Garbage Collected Systems," Proceedings of ACM SIGPLAN Conference on Programming Language Design and Implementation, Jun. 1991, Toronto, Ontario, Canada.

Lam, Wilson, and Moher, "Object Type Directed Garbage Collection to Improve Locality," Proceedings of the International Workshop on Memory Management '92, St. Malo, France, Sep. 1992, pp. 404-425.

Chilimbi and Larus, "Using Generational Garbage Collection to Implement Cache-Conscious Data Placement," International Symposium on Memory Management, Oct. 1998.

Lieberman and Hewitt, "A real-time garbage collector based on the lifetimes of objects," Communications of the ACM, 1983, pp. 419-429, vol. 26, No. 6.

David Ungar, "Generation Scavenging: A Non-Disruptive High Performance Storage Reclamation Algorithm," ACM SIGPLAN Notices, Apr. 1984, pp. 157-167, vol. 19, No. 5.

Andrew W. Appel, "Simple Generational Garbage Collection and Fast Allocation," Software Practice and Experience, 1989, pp. 171-183, vol. 19, No. 2.

Hudson and Diwan, "Adaptive Garbage Collection for Modula-3 and Smalltalk," in OOPSLA/ECOOP Workshop on Garbage Collection in Object-Oriented Systems, Oct. 1990, Edited by Eric Jul and Niels-Cristial Juul.

Hudson and Hosking, "Remembered sets can also play cards," in OOPSLA/ECOOP Workshop on Garbage Collection in Object-Oriented Systems, Oct. 1993, Edited by Moss, Wilson, and Zorn.

Hosking and Moss, "Protection traps and alternatives for memory management of an object-oriented language," ACM Proceedings of the Fourteenth ACM Symposium on Operating Systems Principles, Dec. 1993, pp. 106-119, vol. 27, No. 5.

Hosking, Moss, and Stefanovic, "A Comparative Performance Evaluation of Write Barrier Implementation," in OOPSLA ACM Conference on Object-Oriented Programming, Systems, Languages, and Applications, Oct. 1992, pp. 92-109, vol. 27, No. 10, ACM SIGPLAN Notices, Vancouver, BC, ACM Press.

Patrick G. Sobalvarro, "A Lifetime-based Garbage Collector for LISP Systems on General-Purpose Computers," Massachusetts Institute of Technology, AITR-1417, 1988.

* cited by examiner

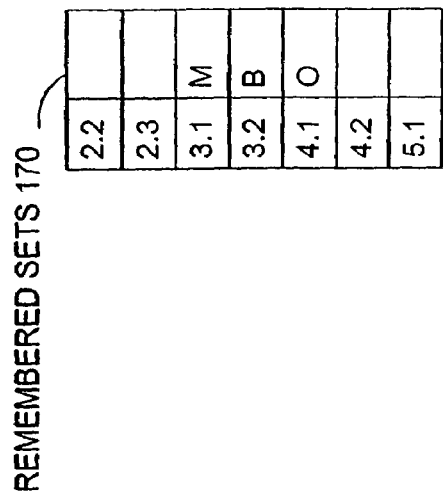
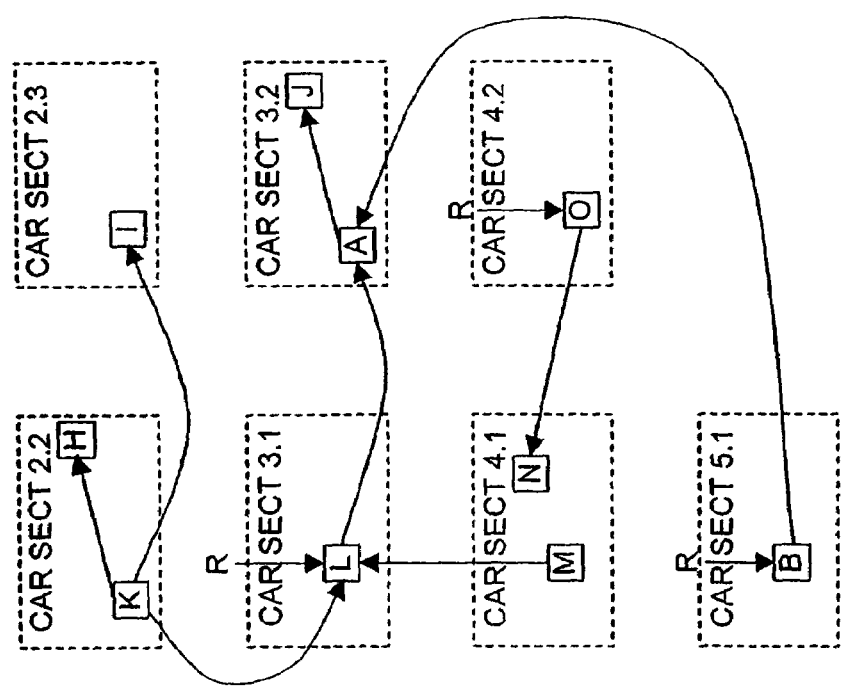
FIG. 12F (Prior Art)

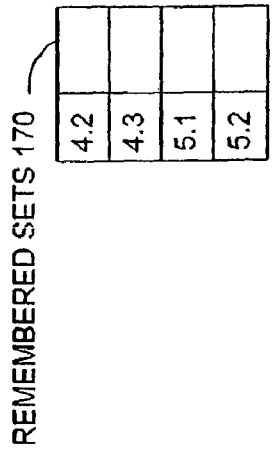
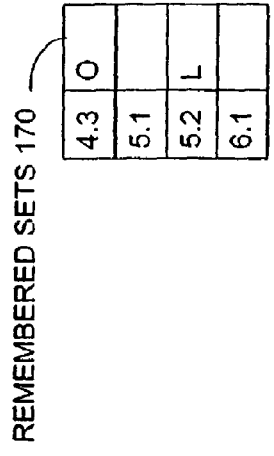
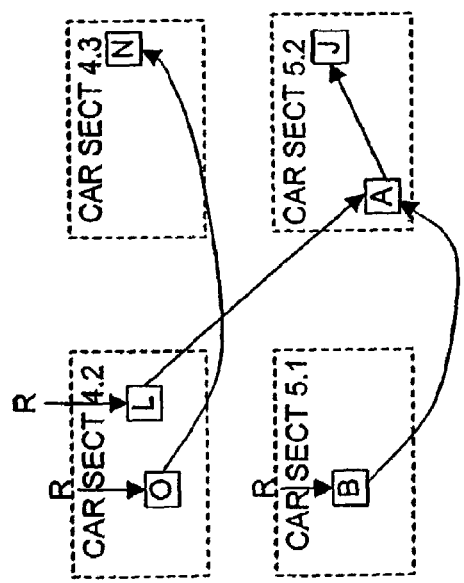
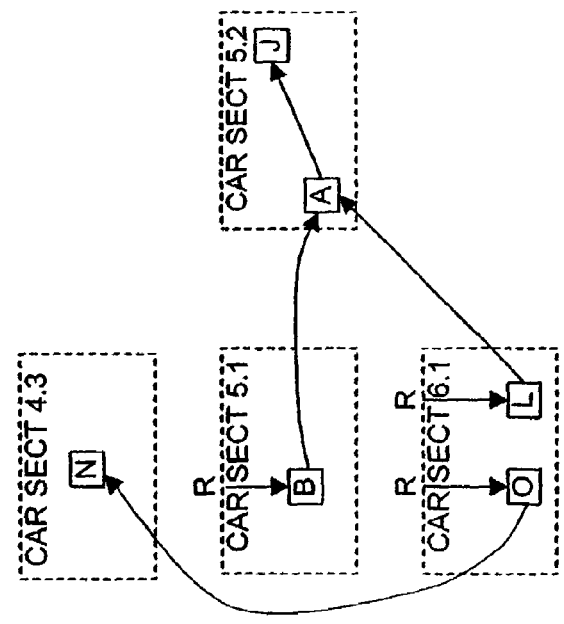
FIG. 12I (Prior Art)
FIG. 12J (Prior Art)

BETTER PLACEMENT OF OBJECTS REACHABLE FROM SPECIAL OBJECTS DURING COLLECTION BASED ON THE TRAIN ALGORITHM

BACKGROUND OF THE INVENTION

1. Field of the Invention

The present invention is directed to memory management. It particularly concerns what has come to be known as "garbage collection."

2. Background Information

In the field of computer systems, considerable effort has been expended on the task of allocating memory to data objects. For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have associated methods, which are routines that can be invoked by reference to the object. They also may belong to a class, which is an organizational entity that may contain method code or other information shared by all objects belonging to that class. In the discussion that follows, though, the term object will not be limited to such structures; it will additionally include structures with which methods and classes are not associated.

The invention to be described below is applicable to systems that allocate memory to objects dynamically. Not all systems employ dynamic allocation. In some computer languages, source programs must be so written that all objects to which the program's variables refer are bound to storage locations at compile time. This storage-allocation approach, sometimes referred to as "static allocation," is the policy traditionally used by the Fortran programming language, for example.

Even for compilers that are thought of as allocating objects only statically, of course, there is often a certain level of abstraction to this binding of objects to storage locations. Consider the typical computer system 10 depicted in FIG. 1, for example. Data, and instructions for operating on them, that a microprocessor 11 uses may reside in on-board cache memory or be received from further cache memory 12, possibly through the mediation of a cache controller 13. That controller 13 can in turn receive such data from system read/write memory ("RAM") 14 through a RAM controller 15 or from various peripheral devices through a system bus 16. The memory space made available to an application program may be "virtual" in the sense that it may actually be considerably larger than RAM 14 provides. So the RAM contents will be swapped to and from a system disk 17.

Additionally, the actual physical operations performed to access some of the most-recently visited parts of the process's address space often will actually be performed in the cache 12 or in a cache on board microprocessor 11 rather than on the RAM 14, with which those caches swap data and instructions just as RAM 14 and system disk 17 do with each other.

A further level of abstraction results from the fact that an application will often be run as one of many processes operating concurrently with the support of an underlying operating system. As part of that system's memory management, the application's memory space may be moved among different actual physical locations many times in order to allow different processes to employ shared physical memory devices. That is, the location specified in the application's machine code may actually result in different physical locations at different times because the operating system adds different offsets to the machine-language-specified location.

Despite these expedients, the use of static memory allocation in writing certain long-lived applications makes it difficult to restrict storage requirements to the available memory space. Abiding by space limitations is easier when the platform provides for dynamic memory allocation, i.e., when memory space to be allocated to a given object is determined only at run time.

Dynamic allocation has a number of advantages, among which is that the run-time system is able to adapt allocation to run-time conditions. For example, the programmer can specify that space should be allocated for a given object only in response to a particular run-time condition. The C-language library function malloc( ) is often used for this purpose. Conversely, the programmer can specify conditions under which memory previously allocated to a given object can be reclaimed for reuse. The C-language library function free( ) results in such memory reclamation.

Because dynamic allocation provides for memory reuse, it facilitates generation of large or long-lived applications, which over the course of their lifetimes may employ objects whose total memory requirements would greatly exceed the available memory resources if they were bound to memory locations statically.

Particularly for long-lived applications, though, allocation and reclamation of dynamic memory must be performed carefully. If the application fails to reclaim unused memory—or, worse, loses track of the address of a dynamically allocated segment of memory—its memory requirements will grow over time to exceed the system's available memory. This kind of error is known as a "memory leak."

Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is known as a "dangling reference," because an application should not retain a reference to a memory location once that location is reclaimed. Explicit dynamic-memory management by using interfaces like malloc( )/free( ) often leads to these problems.

A way of reducing the likelihood of such leaks and related errors is to provide memory-space reclamation in a more-automatic manner. Techniques used by systems that reclaim memory space automatically are commonly referred to as "garbage collection." Garbage collectors operate by reclaiming space that they no longer consider "reachable." Statically allocated objects represented by a program's global variables are normally considered reachable throughout a program's life. Such objects are not ordinarily stored in the garbage collector's managed memory space, but they may contain references to dynamically allocated objects that are, and such objects are considered reachable. Clearly, an object referred to in the processor's call stack is reachable, as is an object referred to by register contents. And an object referred to by any reachable object is also reachable.

The use of garbage collectors is advantageous because, whereas a programmer working on a particular sequence of code can perform his task creditably in most respects with only local knowledge of the application at any given time, memory allocation and reclamation require a global knowledge of the program. Specifically, a programmer dealing with a given sequence of code does tend to know whether some portion of memory is still in use for that sequence of code, but it is considerably more difficult for him to know what the rest of the application is doing with that memory. By tracing references from some conservative notion of a "root set," e.g., global variables, registers, and the call stack, automatic garbage collectors obtain global knowledge in a methodical way. By using a garbage collector, the programmer is relieved of the need to worry about the application's global state and can concentrate on local-state issues, which are more manageable. The result is applications that are more robust, having no dangling references and fewer memory leaks.

Garbage-collection mechanisms can be implemented by various parts and levels of a computing system. One approach is simply to provide them as part of a batch compiler's output. Consider FIG. 2's simple batch-compiler operation, for example. A computer system executes in accordance with compiler object code and therefore acts as a compiler 20. The compiler object code is typically stored on a medium such as FIG. 1's system disk 17 or some other machine-readable medium, and it is loaded into RAM 14 to configure the computer system to act as a compiler. In some cases, though, the compiler object code's persistent storage may instead be provided in a server system remote from the machine that performs the compiling. The electrical signals that carry the digital data by which the computer systems exchange that code are examples of the kinds of electromagnetic signals by which the computer instructions can be communicated. Others are radio waves, microwaves, and both visible and invisible light.

The input to the compiler is the application source code, and the end product of the compiler process is application object code. This object code defines an application 21, which typically operates on input such as mouse clicks, etc., to generate a display or some other type of output. This object code implements the relationship that the programmer intends to specify by his application source code. In one approach to garbage collection, the compiler 20, without the programmer's explicit direction, additionally generates code that automatically reclaims unreachable memory space.

Even in this simple case, though, there is a sense in which the application does not itself provide the entire garbage collector. Specifically, the application will typically call upon the underlying operating system's memory-allocation functions. And the operating system may in turn take advantage of various hardware that lends itself particularly to use in garbage collection. So even a very simple system may disperse the garbage-collection mechanism over a number of computer-system layers.

To get some sense of the variety of system components that can be used to implement garbage collection, consider FIG. 3's example of a more complex way in which various levels of source code can result in the machine instructions that a processor executes. In the FIG. 3 arrangement, the human applications programmer produces source code 22 written in a high-level language. A compiler 23 typically converts that code into "class files." These files include routines written in instructions, called "byte codes" 24, for a "virtual machine" that various processors can be software-configured to emulate. This conversion into byte codes is almost always separated in time from those codes' execution, so FIG. 3 divides the sequence into a "compile-time environment" 25 separate from a "run-time environment" 26, in which execution occurs. One example of a high-level language for which compilers are available to produce such virtual-machine instructions is the Java™ programming language. (Java is a trademark or registered trademark of Sun Microsystems, Inc., in the United States and other countries.)

Most typically, the class files' byte-code routines are executed by a processor under control of a virtual-machine process 27. That process emulates a virtual machine from whose instruction set the byte codes are drawn. As is true of the compiler 23, the virtual-machine process 27 may be specified by code stored on a local disk or some other machine-readable medium from which it is read into FIG. 1's RAM 14 to configure the computer system to implement the garbage collector and otherwise act as a virtual machine. Again, though, that code's persistent storage may instead be provided by a server system remote from the processor that implements the virtual machine, in which case the code would be transmitted electrically or optically to the virtual-machine-implementing processor.

In some implementations, much of the virtual machine's action in executing these byte codes is most like what those skilled in the art refer to as "interpreting," so FIG. 3 depicts the virtual machine as including an "interpreter" 28 for that purpose. In addition to or instead of running an interpreter, many virtual-machine implementations actually compile the byte codes concurrently with the resultant object code's execution, so FIG. 3 depicts the virtual machine as additionally including a "just-in-time" compiler 29. We will refer to the just-in-time compiler and the interpreter together as "execution engines" since they are the methods by which byte code can be executed.

Now, some of the functionality that source-language constructs specify can be quite complicated, requiring many machine-language instructions for their implementation. One quite-common example is a source-language instruction that calls for 64-bit arithmetic on a 32-bit machine. More germane to the present invention is the operation of dynamically allocating space to a new object; the allocation of such objects must be mediated by the garbage collector.

In such situations, the compiler may produce "inline" code to accomplish these operations. That is, all object-code instructions for carrying out a given source-code-prescribed operation will be repeated each time the source code calls for the operation. But inlining runs the risk that "code bloat" will result if the operation is invoked at many source-code locations.

The natural way of avoiding this result is instead to provide the operation's implementation as a procedure, i.e., a single code sequence that can be called from any location in the program. In the case of compilers, a collection of procedures for implementing many types of source-code-specified operations is called a runtime system for the language. The execution engines and the runtime system of a virtual machine are designed together so that the engines "know" what runtime-system procedures are available in the virtual machine (and on the target system if that system provides facilities that are directly usable by an executing virtual-machine program.) So, for example, the just-in-time compiler 29 may generate native code that includes calls to memory-allocation procedures provided by the virtual machine's runtime system. These allocation routines may in turn invoke garbage-collection routines of the runtime system when there is not enough memory available to satisfy an allocation. To represent this fact, FIG. 3 includes block 30 to show that the compiler's output makes calls to the runtime system as well as to the operating system 31, which consists of procedures that are similarly system-resident but are not compiler-dependent.

Although the FIG. 3 arrangement is a popular one, it is by no means universal, and many further implementation types can be expected. Proposals have even been made to implement the virtual machine 27's behavior in a hardware processor, in which case the hardware itself would provide some or all of the garbage-collection function.

The arrangement of FIG. 3 differs from FIG. 2 in that the compiler 23 for converting the human programmer's code does not contribute to providing the garbage-collection function; that results largely from the virtual machine 27's operation. Those skilled in that art will recognize that both of these organizations are merely exemplary, and many modern systems employ hybrid mechanisms, which partake of the characteristics of traditional compilers and traditional interpreters both.

The invention to be described below is applicable independently of whether a batch compiler, a just-in-time compiler, an interpreter, or some hybrid is employed to process source code. In the remainder of this application, therefore, we will use the term compiler to refer to any such mechanism, even if it is what would more typically be called an interpreter.

In short, garbage collectors can be implemented in a wide range of combinations of hardware and/or software. As is true of most of the garbage-collection techniques described in the literature, the invention to be described below is applicable to most such systems.

By implementing garbage collection, a computer system can greatly reduce the occurrence of memory leaks and other software deficiencies in which human programming frequently results. But it can also have significant adverse performance effects if it is not implemented carefully. To distinguish the part of the program that does "useful" work from that which does the garbage collection, the term mutator is sometimes used in discussions of these effects; from the collector's point of view, what the mutator does is mutate active data structures' connectivity.

Some garbage-collection approaches rely heavily on interleaving garbage-collection steps among mutator steps. In one type of garbage-collection approach, for instance, the mutator operation of writing a reference is followed immediately by garbage-collector steps used to maintain a reference count in that object's header, and code for subsequent new-object storage includes steps for finding space occupied by objects whose reference count has fallen to zero. Obviously, such an approach can slow mutator operation significantly.

Other approaches therefore interleave very few garbage-collector-related instructions into the main mutator process but instead interrupt it from time to time to perform garbage-collection cycles, in which the garbage collector finds unreachable objects and reclaims their memory space for reuse. Such an approach will be assumed in discussing FIG. 4's depiction of a simple garbage-collection operation. Within the memory space allocated to a given application is a part 40 managed by automatic garbage collection. In the following discussion, this will be referred to as the "heap," although in other contexts that term refers to all dynamically allocated memory. During the course of the application's execution, space is allocated for various objects 42, 44, 46, 48, and 50. Typically, the mutator allocates space within the heap by invoking the garbage collector, which at some level manages access to the heap. Basically, the mutator asks the garbage collector for a pointer to a heap region where it can safely place the object's data. The garbage collector keeps track of the fact that the thus-allocated region is occupied. It will refrain from allocating that region in response to any other request until it determines that the mutator no longer needs the region allocated to that object.

Garbage collectors vary as to which objects they consider reachable and unreachable. For the present discussion, though, an object will be considered "reachable" if it is referred to, as object 42 is, by a reference in the root set 52. The root set consists of reference values stored in the mutator's threads' call stacks, the CPU registers, and global variables outside the garbage-collected heap. An object is also reachable if it is referred to, as object 46 is, by another reachable object (in this case, object 42). Objects that are not reachable can no longer affect the program, so it is safe to re-allocate the memory spaces that they occupy.

A typical approach to garbage collection is therefore to identify all reachable objects and reclaim any previously allocated memory that the reachable objects do not occupy. A typical garbage collector may identify reachable objects by tracing references from the root set 52. For the sake of simplicity, FIG. 4 depicts only one reference from the root set 52 into the heap 40. (Those skilled in the art will recognize that there are many ways to identify references, or at least data contents that may be references.) The collector notes that the root set points to object 42, which is therefore reachable, and that reachable object 42 points to object 46, which therefore is also reachable. But those reachable objects point to no other objects, so objects 44, 48, and 50 are all unreachable, and their memory space may be reclaimed. This may involve, say, placing that memory space in a list of free memory blocks.

To avoid excessive heap fragmentation, some garbage collectors additionally relocate reachable objects. FIG. 5 shows a typical approach. The heap is partitioned into two halves, hereafter called "semi-spaces." For one garbage-collection cycle, all objects are allocated in one semi-space 54, leaving the other semi-space 56 free. When the garbage-collection cycle occurs, objects identified as reachable are "evacuated" to the other semi-space 56, so all of semi-space 54 is then considered free. Once the garbage-collection cycle has occurred, all new objects are allocated in the lower semi-space 56 until yet another garbage-collection cycle occurs, at which time the reachable objects are evacuated back to the upper semi-space 54.

Although this relocation requires the extra steps of copying the reachable objects and updating references to them, it tends to be quite efficient, since most new objects quickly become unreachable, so most of the current semi-space is actually garbage. That is, only a relatively few, reachable objects need to be relocated, after which the entire semi-space contains only garbage and can be pronounced free for reallocation.

Now, a collection cycle can involve following all reference chains from the basic root set—i.e., from inherently reachable locations such as the call stacks, class statics and other global variables, and registers—and reclaiming all space occupied by objects not encountered in the process. And the simplest way of performing such a cycle is to interrupt the mutator to provide a collector interval in which the entire cycle is performed before the mutator resumes. For certain types of applications, this approach to collection-cycle scheduling is acceptable and, in fact, highly efficient.

For many interactive and real-time applications, though, this approach is not acceptable. The delay in mutator operation that the collection cycle's execution causes can be annoying to a user and can prevent a real-time application from responding to its environment with the required speed. In some applications, choosing collection times opportunistically can reduce this effect. Collection intervals can be inserted when an interactive mutator reaches a point at which it awaits user input, for instance.

So it may often be true that the garbage-collection operation's effect on performance can depend less on the total collection time than on when collections actually occur. But another factor that often is even more determinative is the duration of any single collection interval, i.e., how long the mutator must remain quiescent at any one time. In an interactive system, for instance, a user may never notice hundred-millisecond interruptions for garbage collection, whereas most users would find interruptions lasting for two seconds to be annoying.

The cycle may therefore be divided up among a plurality of collector intervals. When a collection cycle is divided up among a plurality of collection intervals, it is only after a number of intervals that the collector will have followed all reference chains and be able to identify as garbage any objects not thereby reached. This approach is more complex than completing the cycle in a single collection interval; the mutator will usually modify references between collection intervals, so the collector must repeatedly update its view of the reference graph in the midst of the collection cycle. To make such updates practical, the mutator must communicate with the collector to let it know what reference changes are made between intervals.

An even more complex approach, which some systems use to eliminate discrete pauses or maximize resource-use efficiency, is to execute the mutator and collector in concurrent execution threads. Most systems that use this approach use it for most but not all of the collection cycle; the mutator is usually interrupted for a short collector interval, in which a part of the collector cycle takes place without mutation.

Independent of whether the collection cycle is performed concurrently with mutator operation, is completed in a single interval, or extends over multiple intervals is the question of whether the cycle is complete, as has tacitly been assumed so far, or is instead "incremental." In incremental collection, a collection cycle constitutes only an increment of collection: the collector does not follow all reference chains from the basic root set completely. Instead, it concentrates on only a portion, or collection set, of the heap. Specifically, it identifies every collection-set object referred to by a reference chain that extends into the collection set from outside of it, and it reclaims the collection-set space not occupied by such objects, possibly after evacuating them from the collection set.

By thus culling objects referenced by reference chains that do not necessarily originate in the basic root set, the collector can be thought of as expanding the root set to include as roots some locations that may not be reachable. Although incremental collection thereby leaves "floating garbage," it can result in relatively low pause times even if entire collection increments are completed during respective single collection intervals.

Most collectors that employ incremental collection operate in "generations," although this is not necessary in principle. Different portions, or generations, of the heap are subject to different collection policies. New objects are allocated in a "young" generation, and older objects are promoted from younger generations to older or more "mature" generations. Collecting the younger generations more frequently than the others yields greater efficiency because the younger generations tend to accumulate garbage faster; newly allocated objects tend to "die," while older objects tend to "survive."

But generational collection greatly increases what is effectively the root set for a given generation. Consider FIG. 6, which depicts a heap as organized into three generations 58, 60, and 62. Assume that generation 60 is to be collected. The process for this individual generation may be more or less the same as that described in connection with FIGS. 4 and 5 for the entire heap, with one major exception. In the case of a single generation, the root set must be considered to include not only the call stack, registers, and global variables represented by set 52 but also objects in the other generations 58 and 62, which themselves may contain references to objects in generation 60. So pointers must be traced not only from the basic root set 52 but also from objects within the other generations.

One could perform this tracing by simply inspecting all references in all other generations at the beginning of every collection interval, and it turns out that this approach is actually feasible in some situations. But it takes too long in other situations, so workers in this field have employed a number of approaches to expediting reference tracing. One approach is to include so-called write barriers in the mutator process. A write barrier is code added to a write operation to record information from which the collector can determine where references were written or may have been since the last collection interval. A reference list can then be maintained by taking such a list as it existed at the end of the previous collection interval and updating it by inspecting only locations identified by the write barrier as possibly modified since the last collection interval.

One of the many write-barrier implementations commonly used by workers in this art employs what has been referred to as the "card table." FIG. 6 depicts the various generations as being divided into smaller sections, known for this purpose as "cards." Card tables 64, 66, and 68 associated with respective generations contain an entry for each of their cards. When the mutator writes a reference in a card, it makes an appropriate entry in the card-table location associated with that card (or, say, with the card in which the object containing the reference begins). Most write-barrier implementations simply make a Boolean entry indicating that the write operation has been performed, although some may be more elaborate. The mutator having thus left a record of where new or modified references may be, the collector can thereafter prepare appropriate summaries of that information, as will be explained in due course. For the sake of concreteness, we will assume that the summaries are maintained by steps that occur principally at the beginning of each collection interval.

Of course, there are other write-barrier approaches, such as simply having the write barrier add to a list of addresses where references where written. Also, although there is no reason in principle to favor any particular number of generations, and although FIG. 6 shows three, most generational garbage collectors have only two generations, of which one is the young generation and the other is the mature generation. Moreover, although FIG. 6 shows the generations as being of the same size, a more-typical configuration is for the young generation to be considerably smaller. Finally, although we assumed for the sake of simplicity that collection during a given interval was limited to only one generation, a more-typical approach is actually to collect the whole young generation at every interval but to collect the mature one less frequently.

Some collectors collect the entire young generation in every interval and may thereafter perform mature-generation collection in the same interval. It may therefore take relatively little time to scan all young-generation objects remaining after young-generation collection to find references into the mature generation. Even when such collectors do use card tables, therefore, they often do not use them for finding young-generation references that refer to mature-generation objects. On the other hand, laboriously scanning the entire mature generation for references to young-generation (or mature-generation) objects would ordinarily take too long, so the collector uses the card table to limit the amount of memory it searches for mature-generation references.

Now, although it typically takes very little time to collect the young generation, it may take more time than is acceptable within a single garbage-collection cycle to collect the entire mature generation. So some garbage collectors may collect the mature generation incrementally; that is, they may perform only a part of the mature generation's collection during any particular collection cycle. Incremental collection presents the problem that, since the generation's unreachable objects outside the "collection set" of objects processed during that cycle cannot be recognized as unreachable, collection-set objects to which they refer tend not to be, either.

To reduce the adverse effect this would otherwise have on collection efficiency, workers in this field have employed the "train algorithm," which FIG. 7 depicts. A generation to be collected incrementally is divided into sections, which for reasons about to be described are referred to as "car sections." Conventionally, a generation's incremental collection occurs in fixed-size sections, and a car section's size is that of the generation portion to be collected during one cycle.

The discussion that follows will occasionally employ the nomenclature in the literature by using the term car instead of car section. But the literature seems to use that term to refer variously not only to memory sections themselves but also to data structures that the train algorithm employs to manage them when they contain objects, as well as to the more-abstract concept that the car section and managing data structure represent in discussions of the algorithm. So the following discussion will more frequently use the expression car section to emphasize the actual sections of memory space for whose management the car concept is employed.

According to the train algorithm, the car sections are grouped into "trains," which are ordered, conventionally according to age. For example, FIG. 7 shows an oldest train 73 consisting of a generation 74's three car sections described by associated data structures 75, 76, and 78, while a second train 80 consists only of a single car section, represented by structure 82, and the youngest train 84 (referred to as the "allocation train") consists of car sections that data structures 86 and 88 represent. As will be seen below, car sections' train memberships can change, and any car section added to a train is typically added to the end of a train.

Conventionally, the car collected in an increment is the one added earliest to the oldest train, which in this case is car 75. All of the generation's cars can thus be thought of as waiting for collection in a single long line, in which cars are ordered in accordance with the order of the trains to which they belong and, within trains, in accordance with the order in which they were added to those trains.

As is usual, the way in which reachable objects are identified is to determine whether there are references to them in the root set or in any other object already determined to be reachable. In accordance with the train algorithm, the collector additionally performs a test to determine whether there are any references at all from outside the oldest train to objects within it. If there are not, then all cars within the train can be reclaimed, even though not all of those cars are in the collection set. And the train algorithm so operates that inter-car references tend to be grouped into trains, as will now be explained.

To identify references into the car from outside of it, train-algorithm implementations typically employ "remembered sets." As card tables are, remembered sets are used to keep track of references. Whereas a card-table entry contains information about references that the associated card contains, though, a remembered set associated with a given region contains information about references into that region from locations outside of it. In the case of the train algorithm, remembered sets are associated with car sections. Each remembered set, such as car 75's remembered set 90, lists locations in the generation that contain references into the associated car section.

The remembered sets for all of a generation's cars are typically updated at the start of each collection cycle. To illustrate how such updating and other collection operations may be carried out, FIGS. 8A and 8B (together, "FIG. 8") depict an operational sequence in a system of the typical type mention above. That is, it shows a sequence of operations that may occur in a system in which the entire garbage-collected heap is divided into two generations, namely, a young generation and an old generation, and in which the young generation is much smaller than the old generation. FIG. 8 is also based on the assumption and that the train algorithm is used only for collecting the old generation.

Block 102 represents a period of the mutator's operation. As was explained above, the mutator makes a card-table entry to identify any card that it has "dirtied" by adding or modifying a reference that the card contains. At some point, the mutator will be interrupted for collector operation. Different implementations employ different events to trigger such an interruption, but we will assume for the sake of concreteness that the system's dynamic-allocation routine causes such interruptions when no room is left in the young generation for any further allocation. A dashed line 103 represents the transition from mutator operation and collector operation.

In the system assumed for the FIG. 8 example, the collector collects the (entire) young generation each time such an interruption occurs. When the young generation's collection ends, the mutator operation usually resumes, without the collector's having collected any part of the old generation. Once in a while, though, the collector also collects part of the old generation, and FIG. 8 is intended to illustrate such an occasion.

When the collector's interval first starts, it first processes the card table, in an operation that block 104 represents. As was mentioned above, the collector scans the "dirtied" cards for references into the young generation. If a reference is found, that fact is memorialized appropriately. If the reference refers to a young-generation object, for example, an expanded card table may be used for this purpose. For each card, such an expanded card table might include a multi-byte array used to summarize the card's reference contents. The summary may, for instance, be a list of offsets that indicate the exact locations within the card of references to young-generation objects, or it may be a list of fine-granularity "sub-cards" within which references to young-generation objects may be found. If the reference refers to an old-generation object, the collector often adds an entry to the remembered set associated with the car containing that old-generation object. The entry identifies the reference's location, or at least a small region in which the reference can be found. For reasons that will become apparent, though, the collector will typically not bother to place in the remembered set the locations of references from objects in car sections farther forward in the collection queue than the referred-to object, i.e., from objects in older trains or in cars added earlier to the same train.

The collector then collects the young generation, as block 105 indicates. (Actually, young-generation collection may be interleaved with the dirty-region scanning, but the drawing illustrates it for purpose of explanation as being separate.) If a young-generation object is referred to by a reference that card-table scanning has revealed, that object is considered to be potentially reachable, as is any young-generation object referred to by a reference in the root set or in another reachable young-generation object. The space occupied by any young-generation object thus considered reachable is with-held from reclamation. For example, it may be evacuated to a young-generation semi-space that will be used for allocation during the next mutator interval. It may instead be promoted into the older generation, where it is placed into a car containing a reference to it or into a car in the last train. Or some other technique may be used to keep the memory space it occupies off the system's free list. The collector then reclaims any young-generation space occupied by any other objects, i.e., by any young-generation objects not identified as transitively reachable through references located outside the young generation.

The collector then performs the train algorithm's central test, referred to above, of determining whether there are any references into the oldest train from outside of it. As was mentioned above, the actual process of determining, for each object, whether it can be identified as unreachable is performed for only a single car section in any cycle. In the absence of features such as those provided by the train algorithm, this would present a problem, because garbage structures may be larger than a car section. Objects in such structures would therefore (erroneously) appear reachable, since they are referred to from outside the car section under consideration. But the train algorithm additionally keeps track of whether there are any references into a given car from outside the train to which it belongs, and trains' sizes are not limited. As will be apparent presently, objects not found to be unreachable are relocated in such a way that garbage structures tend to be gathered into respective trains into which, eventually, no references from outside the train point. If no references from outside the train point to any objects inside the train, the train can be recognized as containing only garbage. This is the test that block 106 represents. All cars in a train thus identified as containing only garbage can be reclaimed.

The question of whether old-generation references point into the train from outside of it is (conservatively) answered in the course of updating remembered sets; in the course of updating a car's remembered set, it is a simple matter to flag the car as being referred to from outside the train. The step—106 test additionally involves determining whether any references from outside the old generation point into the oldest train. Various approaches to making this determination have been suggested, including the conceptually simple approach of merely following all reference chains from the root set until those chains (1) terminate, (2) reach an old-generation object outside the oldest train, or (3) reach an object in the oldest train. In the two-generation example, most of this work can be done readily by identifying references into the collection set from live young-generation objects during the young-generation collection. If one or more such chains reach the oldest train, that train includes reachable objects. It may also include reachable objects if the remembered-set-update operation has found one or more references into the oldest train from outside of it. Otherwise, that train contains only garbage, and the collector reclaims all of its car sections for reuse, as block 107 indicates. The collector may then return control to the mutator, which resumes execution, as FIG. 8B's block 108 indicates.

If the train contains reachable objects, on the other hand, the collector turns to evacuating potentially reachable objects from the collection set. The first operation, which block 110 represents, is to remove from the collection set any object that is reachable from the root set by way of a reference chain that does not pass through the part of the old generation that is outside of the collection set. In the illustrated arrangement, in which there are only two generations, and the young generation has previously been completely collected during the same interval, this means evacuating from a collection set any object that (1) is directly referred to by a reference in the root set, (2) is directly referred to by a reference in the young generation (in which no remaining objects have been found unreachable), or (3) is referred to by any reference in an object thereby evacuated. All of the objects thus evacuated are placed in cars in the youngest train, which was newly created during the collection cycle. Certain of the mechanics involved in the evacuation process are described in more detail in connection with similar evacuation performed, as blocks 112 and 114 indicate, in response to remembered-set entries.

FIG. 9 illustrates how the processing represented by block 114 proceeds. The entries identify heap regions, and, as block 116 indicates, the collector scans the thus-identified heap regions to find references to locations in the collection-set. As blocks 118 and 120 indicate, that entry's processing continues until the collector finds no more such references. Every time the collector does find such a reference, it checks to determine whether, as a result of a previous entry's processing, the referred-to object has already been evacuated. If it has not, the collector evacuates the referred-to object to a (possibly new) car in the train containing the reference, as blocks 122 and 124 indicate.

As FIG. 10 indicates, the evacuation operation includes more than just object relocation, which block 126 represents. Once the object has been moved, the collector places a forwarding pointer in the collection-set location from which it was evacuated, for a purpose that will become apparent presently. Block 128 represents that step. (Actually, there are some cases in which the evacuation is only a "logical" evacuation: the car containing the object is simply re-linked to a different logical place in the collection sequence, but its address does not change. In such cases, forwarding pointers are unnecessary.) Additionally, the reference in response to which the object was evacuated is updated to point to the evacuated object's new location, as block 130 indicates. And, as block 132 indicates, any reference contained in the evacuated object is processed, in an operation that FIGS. 11A and 11B (together, "FIG. 11") depict.

For each one of the evacuated object's references, the collector checks to see whether the location that it refers to is in the collection set. As blocks 134 and 136 indicate, the reference processing continues until all references in the evacuated object have been processed. In the meantime, if a reference refers to a collection-set location that contains an object not yet evacuated, the collector evacuates the referred-to object to the train to which the evacuated object containing the reference was evacuated, as blocks 138 and 140 indicate.

If the reference refers to a location in the collection set from which the object has already been evacuated, then the collector uses the forwarding pointer left in that location to update the reference, as block 142 indicates. Before the processing of FIG. 11, the remembered set of the referred-to object's car will have an entry that identifies the evacuated object's old location as one containing a reference to the referred-to object. But the evacuation has placed the reference in a new location, for which the remembered set of the referred-to object's car may not have an entry. So, if that new location is not as far forward as the referred-to object, the collector adds to that remembered set an entry identifying the reference's new region, as blocks 144 and 146 indicate. As the drawings show, the same type of remembered-set update is performed if the object referred to by the evacuated reference is not in the collection set.

Now, some train-algorithm implementations postpone processing of the references contained in evacuated collection-set objects until after all directly reachable collection-set objects have been evacuated. In the implementation that FIG. 10 illustrates, though, the processing of a given evacuated object's references occurs before the next object is evacuated. So FIG. 11's blocks 134 and 148 indicate that the FIG. 11 operation is completed when all of the references contained in the evacuated object have been processed. This completes FIG. 10's object-evacuation operation, which FIG. 9's block 124 represents.

As FIG. 9 indicates, each collection-set object referred to by a reference in a remembered-set-entry-identified location is thus evacuated if it has not been already. If the object has already been evacuated from the referred-to location, the reference to that location is updated to point to the location to which the object has been evacuated. If the remembered set associated with the car containing the evacuated object's new location does not include an entry for the reference's location, it is updated to do so if the car containing the reference is younger than the car containing the evacuated object. Block 150 represents updating the reference and, if necessary, the remembered set.

As FIG. 8's blocks 112 and 114 indicate, this processing of collection-set remembered sets is performed initially only for entries that do not refer to locations in the oldest train. Those that do are processed only after all others have been, as blocks 152 and 154 indicate.

When this process has been completed, the collection set's memory space can be reclaimed, as block 164 indicates, since no remaining object is referred to from outside the collection set: any remaining collection-set object is unreachable. The collector then relinquishes control to the mutator.

FIGS. 12A–12J illustrate results of using the train algorithm. FIG. 12A represents a generation in which objects have been allocated in nine car sections. The oldest train has four cars, numbered 1.1 through 1.4. Car 1.1 has two objects, A and B. There is a reference to object B in the root set (which, as was explained above, includes live objects in the other generations). Object A is referred to by object L, which is in the third train's sole car section. In the generation's remembered sets 170, a reference in object L has therefore been recorded against car 1.1.

Processing always starts with the oldest train's earliest-added car, so the garbage collector refers to car 1.1's remembered set and finds that there is a reference from object L into the car being processed. It accordingly evacuates object A to the train that object L occupies. The object being evacuated is often placed in one of the selected train's existing cars, but we will assume for present purposes that there is not enough room. So the garbage collector evacuates object A into a new car section and updates appropriate data structures to identify it as the next car in the third train. FIG. 12B depicts the result: a new car has been added to the third train, and object A is placed in it.

FIG. 12B also shows that object B has been evacuated to a new car outside the first train. This is because object B has an external reference, which, like the reference to object A, is a reference from outside the first train, and one goal of the processing is to form trains into which there are no further references. Note that, to maintain a reference to the same object, object L's reference to object A has had to be rewritten, and so have object B's reference to object A and the inter-generational pointer to object B. In the illustrated example, the garbage collector begins a new train for the car into which object B is evacuated, but this is not a necessary requirement of the train algorithm. That algorithm requires only that externally referenced objects be evacuated to a newer train.

Since car 1.1 no longer contains live objects, it can be reclaimed, as FIG. 12B also indicates. Also note that the remembered set for car 2.1 now includes the address of a reference in object A, whereas it did not before. As was stated before, remembered sets in the illustrated embodiment include only references from cars further back in the order than the one with which the remembered set is associated. The reason for this is that any other cars will already be reclaimed by the time the car associated with that remembered set is processed, so there is no reason to keep track of references from them.

The next step is to process the next car, the one whose index is 1.2. Conventionally, this would not occur until some collection cycle after the one during which car 1.1 is collected. For the sake of simplicity we will assume that the mutator has not changed any references into the generation in the interim.

FIG. 12B depicts car 1.2 as containing only a single object, object C, and that car's remembered set contains the address of an inter-car reference from object F. The garbage collector follows that reference to object C. Since this identifies object C as possibly reachable, the garbage collector evacuates it from car set 1.2, which is to be reclaimed. Specifically, the garbage collector removes object C to a new car section, section 1.5, which is linked to the train to which the referring object F's car belongs. Of course, object F's reference needs to be updated to object C's new location. FIG. 12C depicts the evacuation's result.

FIG. 12C also indicates that car set 1.2 has been reclaimed, and car 1.3 is next to be processed. The only address in car 1.3's remembered set is that of a reference in object G. Inspection of that reference reveals that it refers to object F. Object F may therefore be reachable, so it must be evacuated before car section 1.3 is reclaimed. On the other hand, there are no references to objects D and E, so they are clearly garbage. FIG. 12D depicts the result of reclaiming car 1.3's space after evacuating possibly reachable object F.

In the state that FIG. 12D depicts, car 1.4 is next to be processed, and its remembered set contains the addresses of references in objects K and C. Inspection of object K's reference reveals that it refers to object H, so object H must be evacuated. Inspection of the other remembered-set entry, the reference in object C, reveals that it refers to object G, so that object is evacuated, too. As FIG. 12E illustrates, object H must be added to the second train, to which its referring object K belongs. In this case there is room enough in car 2.2, which its referring object K occupies, so evacuation of object H does not require that object K's reference to object H be added to car 2.2's remembered set. Object G is evacuated to a new car in the same train, since that train is where referring object C resides. And the address of the reference in object G to object C is added to car 1.5's remembered set.

FIG. 12E shows that this processing has eliminated all references into the first train, and it is an important part of the train algorithm to test for this condition. That is, even though there are references into both of the train's cars, those cars' contents can be recognized as all garbage because there are no references into the train from outside of it. So all of the first train's cars are reclaimed.

The collector accordingly processes car 2.1 during the next collection cycle, and that car's remembered set indicates that there are two references outside the car that refer to objects within it. Those references are in object K, which is in the same train, and object A, which is not. Inspection of those references reveals that they refer to objects I and J, which are evacuated.

The result, depicted in FIG. 12F, is that the remembered sets for the cars in the second train reveal no inter-car references, and there are no inter-generational references into it, either. That train's car sections therefore contain only garbage, and their memory space can be reclaimed.

So car 3.1 is processed next. Its sole object, object L, is referred to inter-generationally as well as by a reference in the fourth train's object M. As FIG. 12G shows, object L is therefore evacuated to the fourth train. And the address of the reference in object L to object A is placed in the remembered set associated with car 3.2, in which object A resides.

The next car to be processed is car 3.2, whose remembered set includes the addresses of references into it from objects B and L. Inspection of the reference from object B reveals that it refers to object A, which must therefore be evacuated to the fifth train before car 3.2 can be reclaimed. Also, we assume that object A cannot fit in car section 5.1, so a new car 5.2 is added to that train, as FIG. 12H shows, and object A is placed in its car section. All referred-to objects in the third train having been evacuated, that (single-car) train can be reclaimed in its entirety.

A further observation needs to be made before we leave FIG. 12G. Car 3.2's remembered set additionally lists a reference in object L, so the garbage collector inspects that reference and finds that it points to the location previously occupied by object A. This brings up a feature of copying-collection techniques such as the typical train-algorithm implementation. When the garbage collector evacuates an object from a car section, it marks the location as having been evacuated and leaves the address of the object's new location. So, when the garbage collector traces the reference from object L, it finds that object A has been removed, and it accordingly copies the new location into object L as the new value of its reference to object A.

In the state that FIG. 12H illustrates, car 4.1 is the next to be processed. Inspection of the fourth train's remembered sets reveals no inter-train references into it, but the inter-generational scan (possibly performed with the aid of FIG. 6's card tables) reveals inter-generational references into car 4.2. So the fourth train cannot be reclaimed yet. The garbage collector accordingly evacuates car 4.1's referred-to objects in the normal manner, with the result that FIG. 12I depicts.

In that state, the next car to be processed has only inter-generational references into it. So, although its referred-to objects must therefore be evacuated from the train, they cannot be placed into trains that contain references to them. Conventionally, such objects are evacuated to a train at the end of the train sequence. In the illustrated implementation, a new train is formed for this purpose, so the result of car 4.2's processing is the state that FIG. 12J depicts.

Processing continues in this same fashion. Of course, subsequent collection cycles will not in general proceed, as in the illustrated cycles, without any reference changes by the mutator and without any addition of further objects. But reflection reveals that the general approach just described still applies when such mutations occur.

Although the train algorithm provides an advantageous way of performing incremental collection, aspects of it are costly. In particular, a given object in a garbage structure may need to be evacuated in each of a relatively large number of collection increments before it is grouped with the other of the structure's objects and the structure can thereby be recognized as garbage.

SUMMARY OF THE INVENTION

I have found a way to reduce how often certain objects must be evacuated. In accordance with the invention, an object in the collection set that is to be evacuated because of the existence of a reference to it outside of the collection set may be evacuated to a train younger than the train that contains that reference. If that reference is located in an object referred to from a younger train, the collector may evacuate the collection-set object to that younger train rather than to the train from which the collection-set object is referred.

Ordinarily, identifying such a younger train would be too time-consuming to be worthwhile. But I have recognized that it can readily be done if the car containing the reference to the collection-set object is a single-object car. In that case, the youngest car from which the object containing the reference may be referred to is simply the youngest car containing a location identified by the remembered set associated with the car containing the reference.

BRIEF DESCRIPTION OF THE DRAWINGS

The invention description below refers to the accompanying drawings, of which:

FIGS. 12A–12J, discussed above, are diagrams that illustrate a collection scenario that can result from using the train algorithm;

DETAILED DESCRIPTION OF AN ILLUSTRATIVE EMBODIMENT

Although the present invention deals with the train algorithm, it need not be practiced in a collector that restricts collection activity to intervals dedicated only to collection. Nor, if it is, need a full collection increment be performed entirely within a single such interval. Even in embodiments in which every collection increment is performed entirely within a respective single interval, moreover, the implementation of that algorithm need not be the same as the one described above in connection with FIGS. 8A, 8B, and 9–11.

Figure 1:
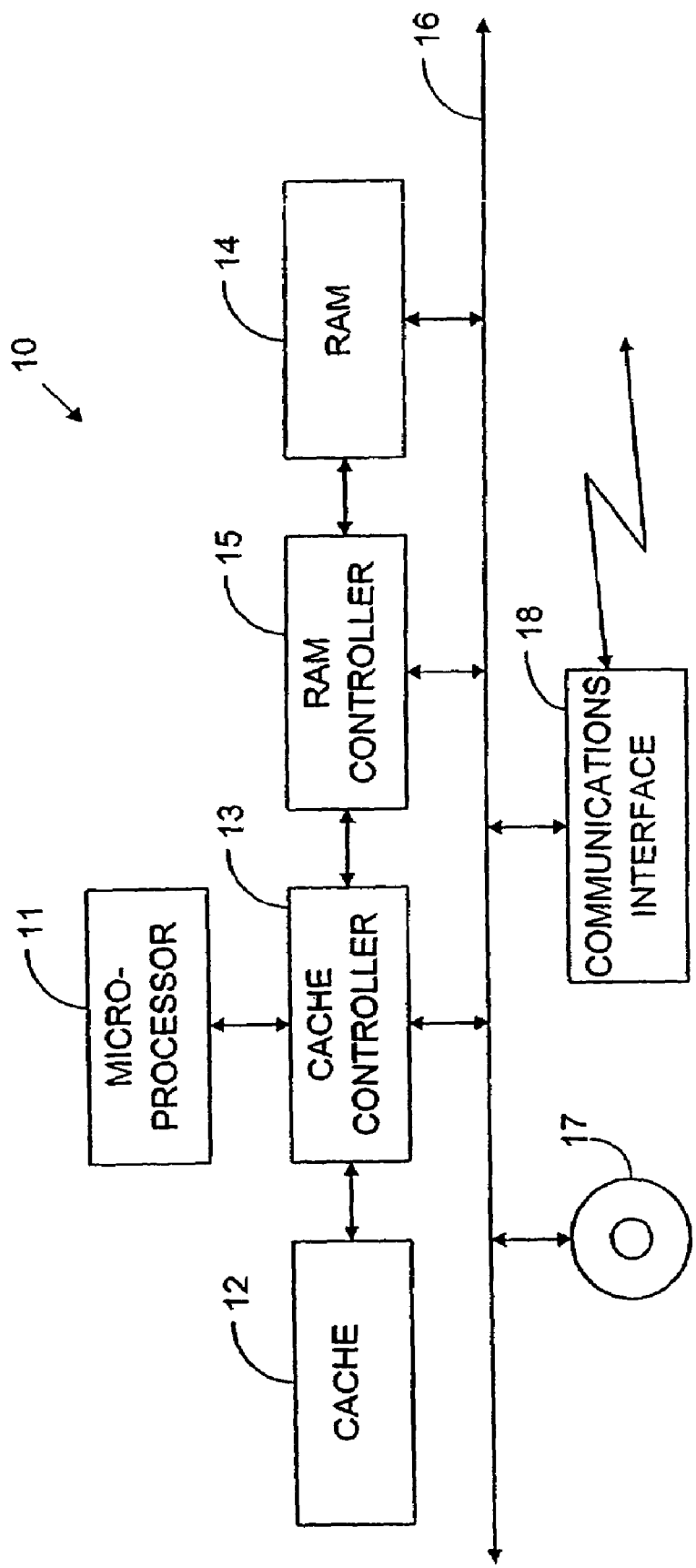
FIG. 1, discussed above, is a block diagram of a computer system in which the present invention's teachings can be practiced.
Figure 2:
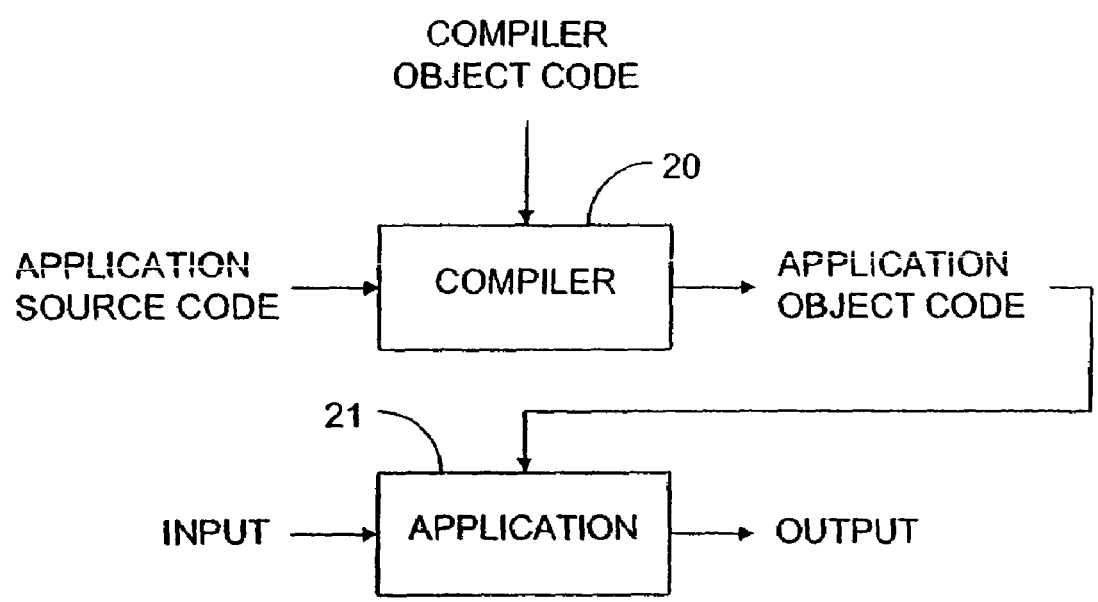
FIG. 2 is, discussed above, is a block diagram that illustrates a compiler's basic functions.
Figure 3:
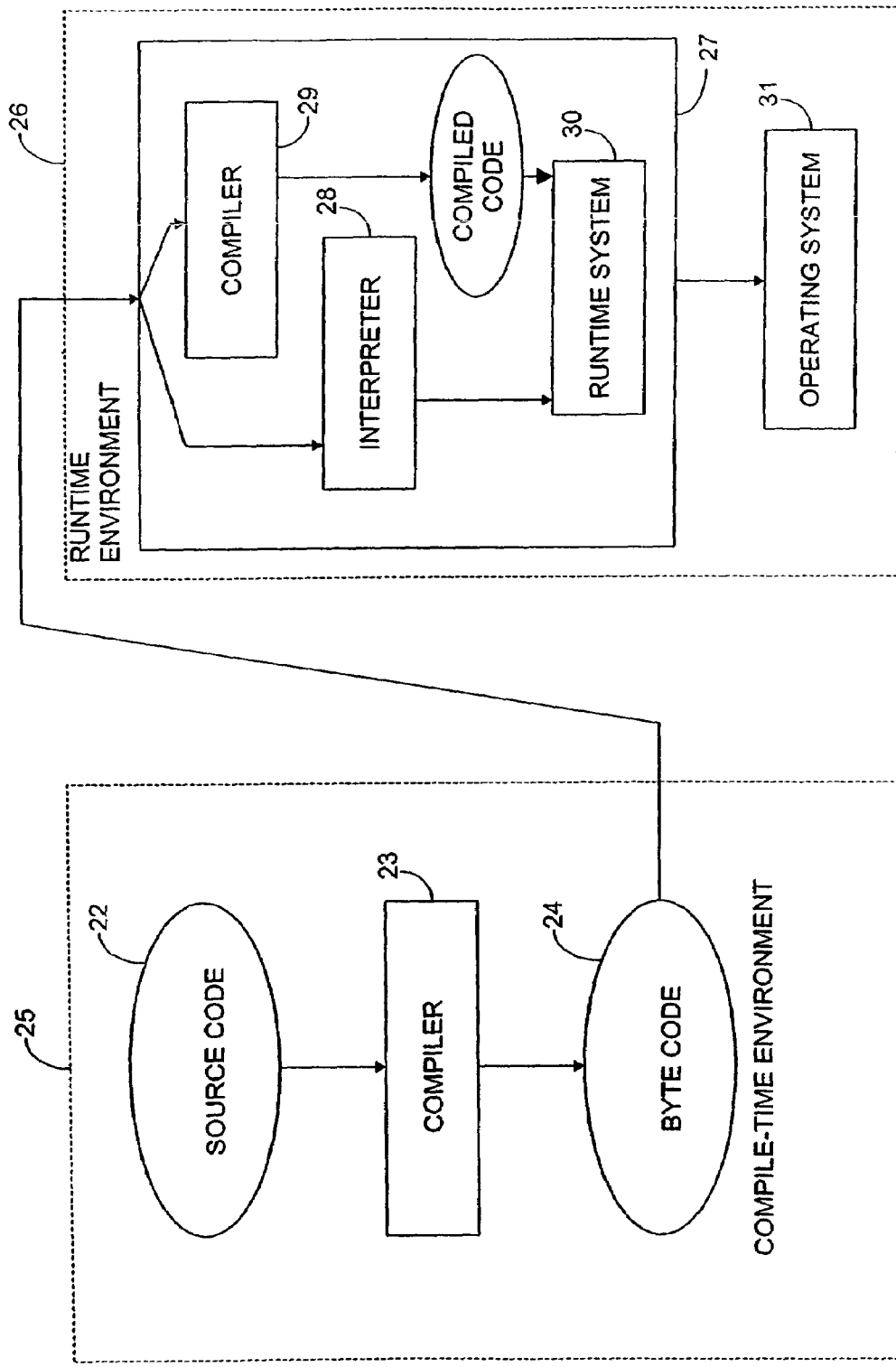
FIG. 3, discussed above, is a block diagram that illustrates a more-complicated compiler/interpreter organization.
Figure 4:
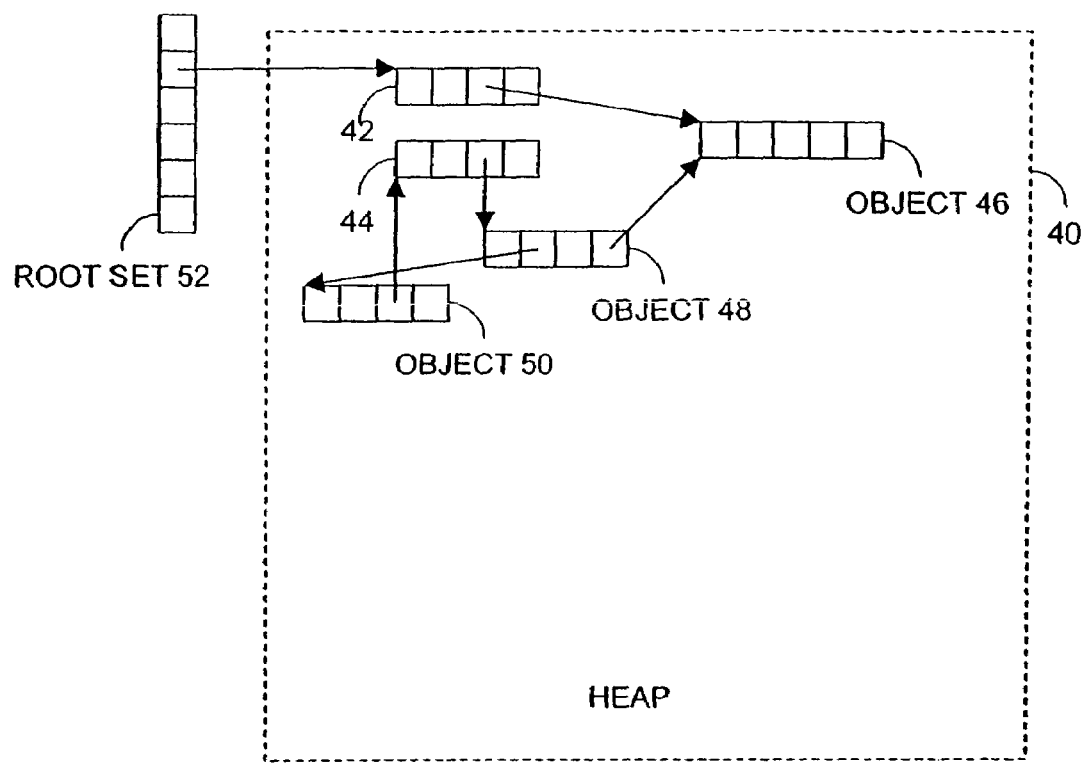
FIG. 4, discussed above, is a diagram that illustrates a basic garbage-collection mechanism.
Figure 5:
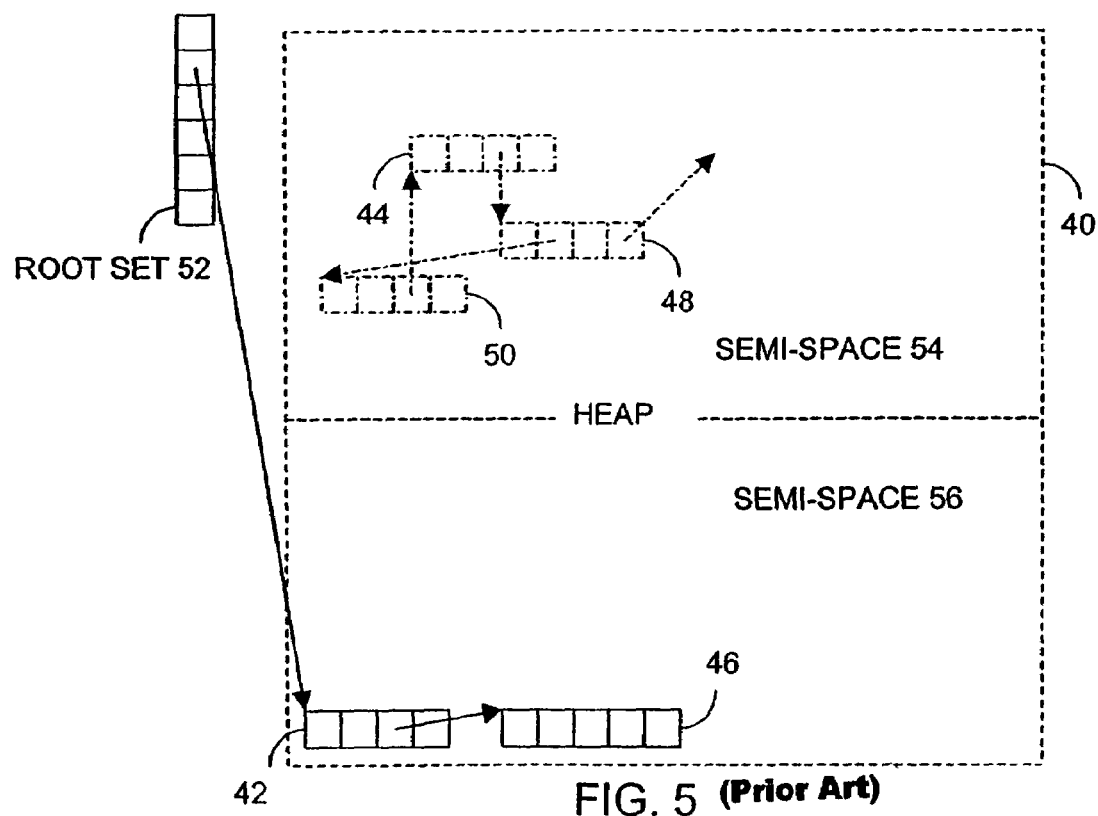
FIG. 5, discussed above, is a similar diagram illustrating that garbage-collection approach's relocation operation.
Figure 6:
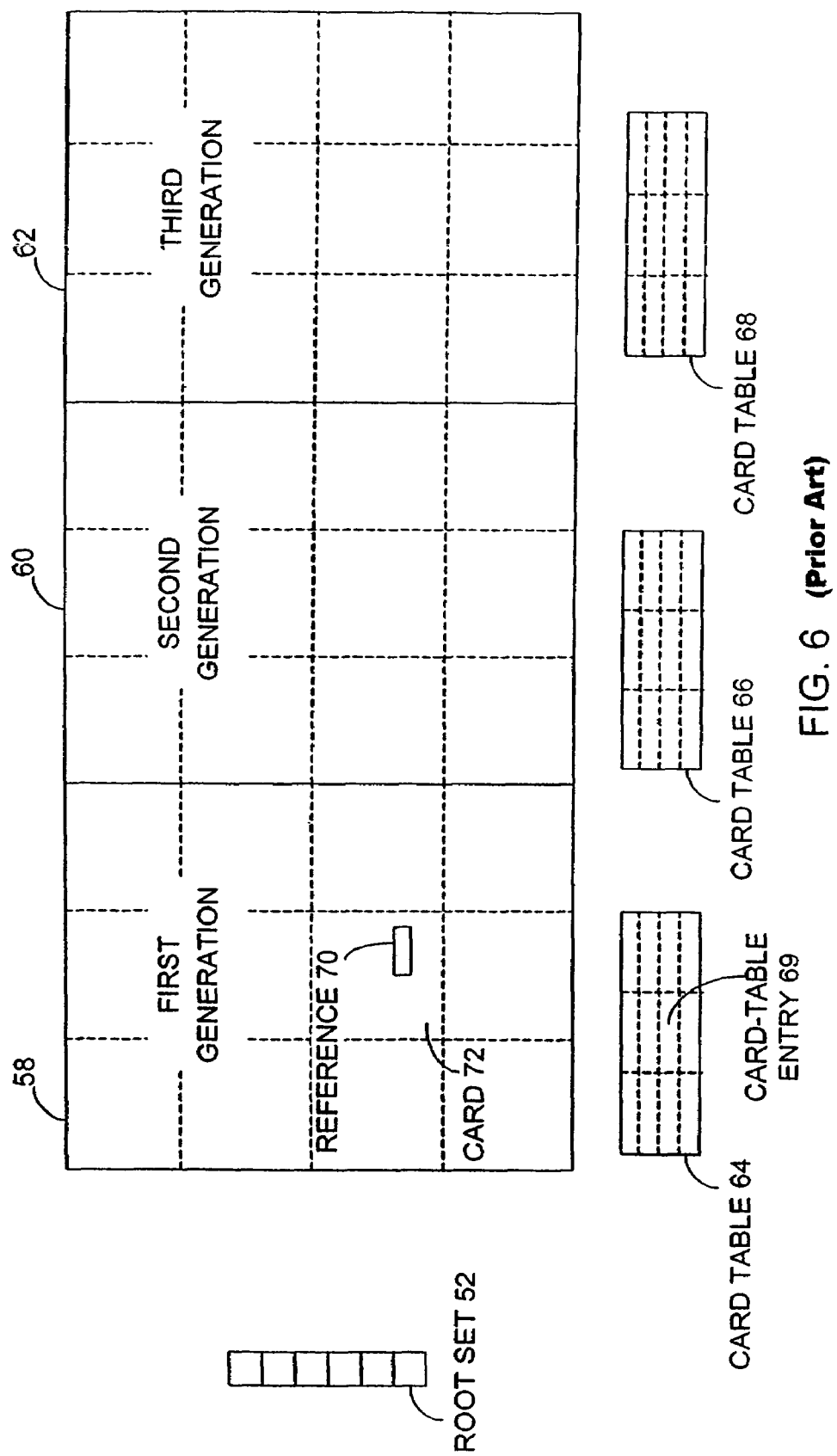
FIG. 6, discussed above, is a diagram that illustrates a garbage-collected heap's organization into generations.
Figure 7:
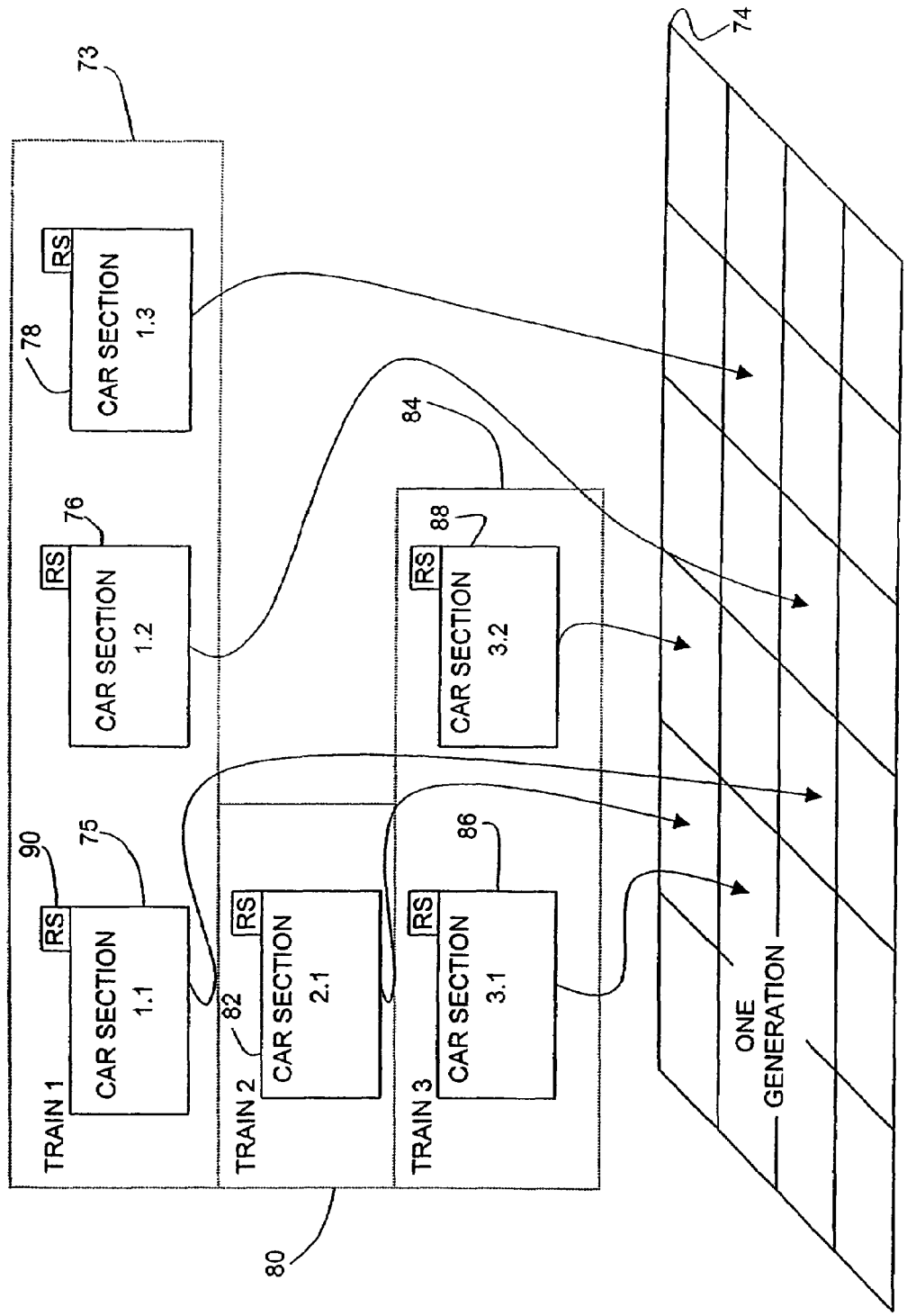
FIG. 7, discussed above, is a diagram that illustrates a generation organization employed for the train algorithm.
Figure 8A:
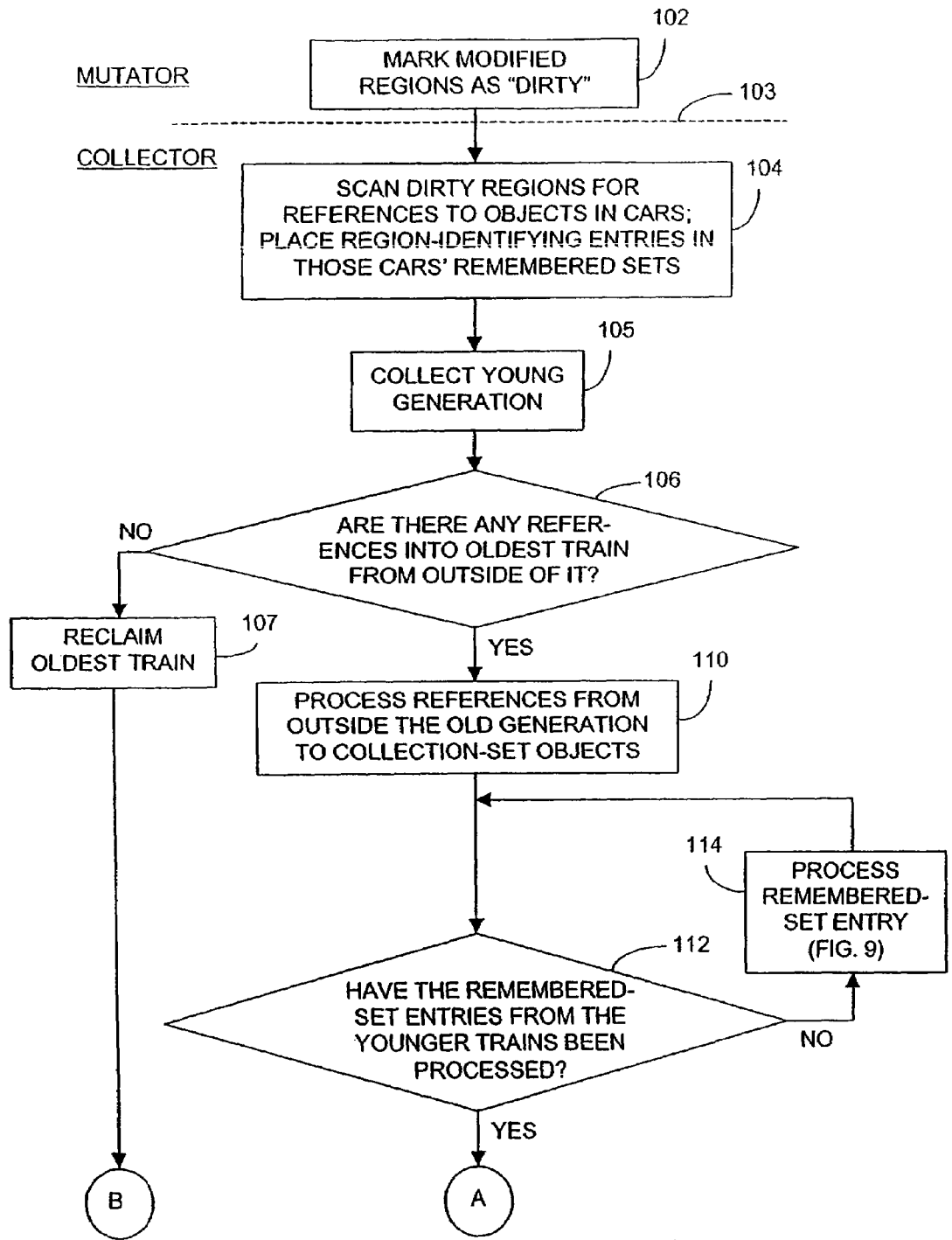
FIGS. 8A and 8B, discussed above, together constitute a flow chart that illustrates a garbage-collection interval that includes old-generation collection.
Figure 8B:
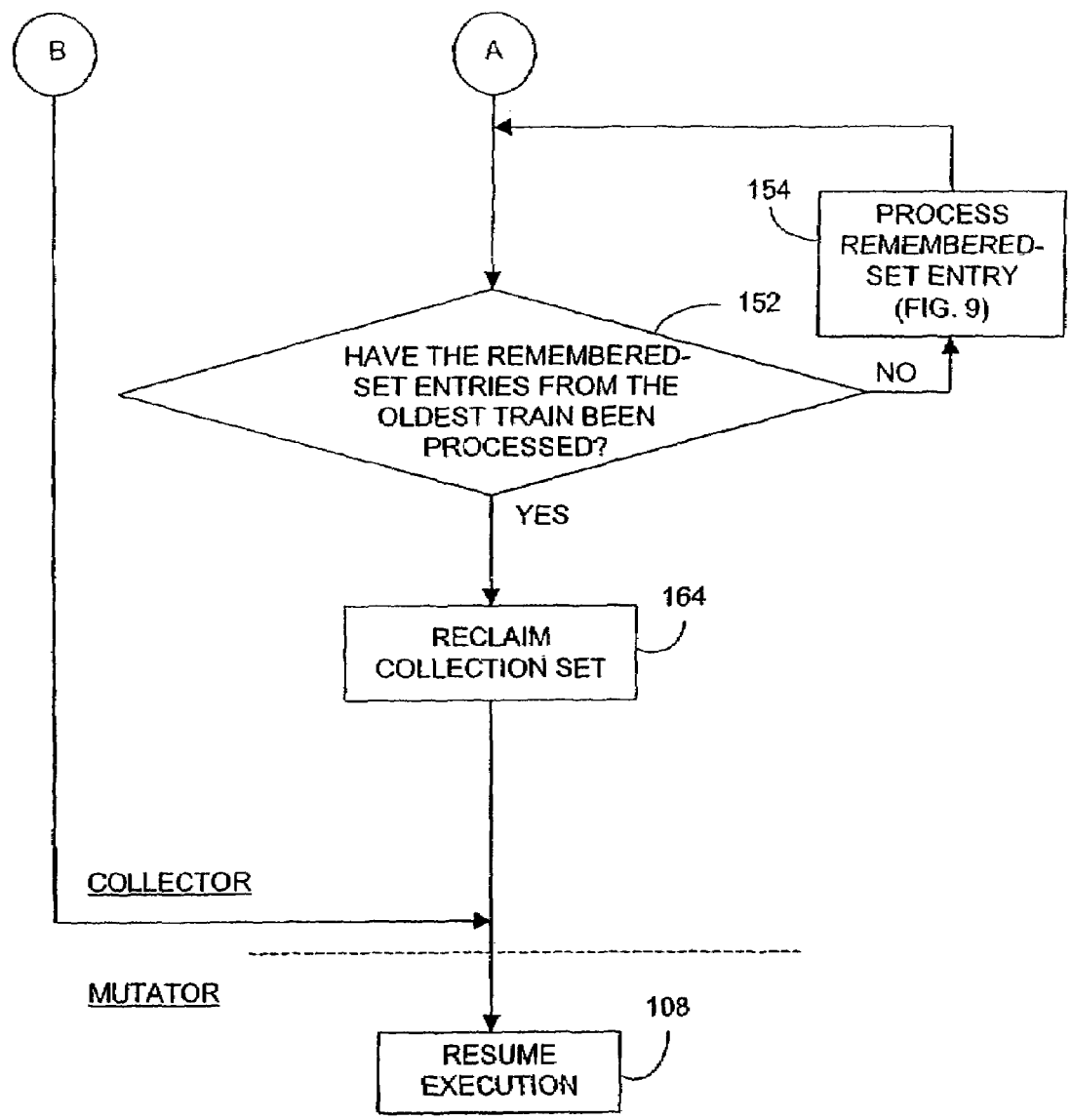
Figure 9:
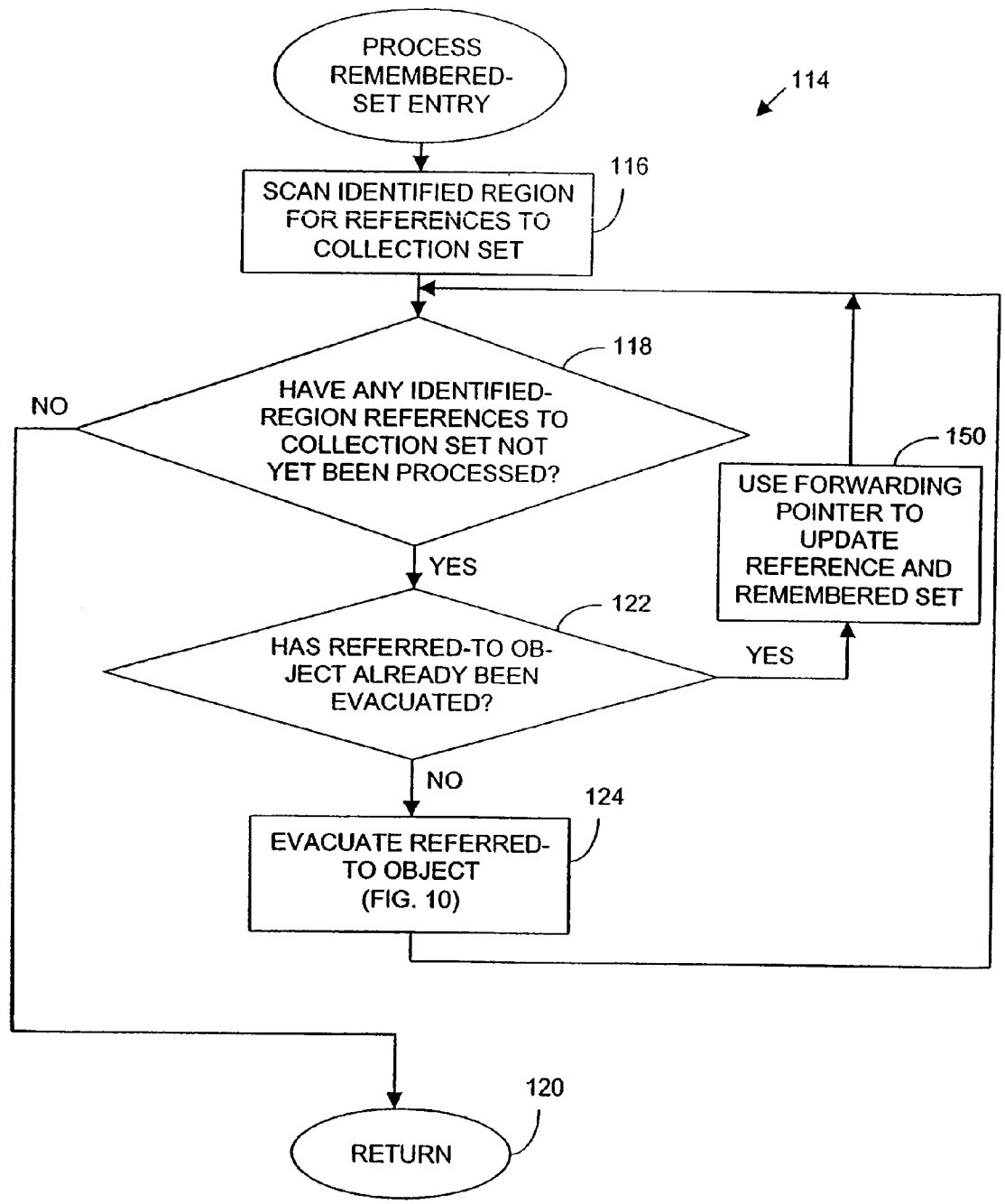
FIG. 9, discussed above, is a flow chart that illustrates in more detail the remembered-set processing included in FIG. 8A.
Figure 10:
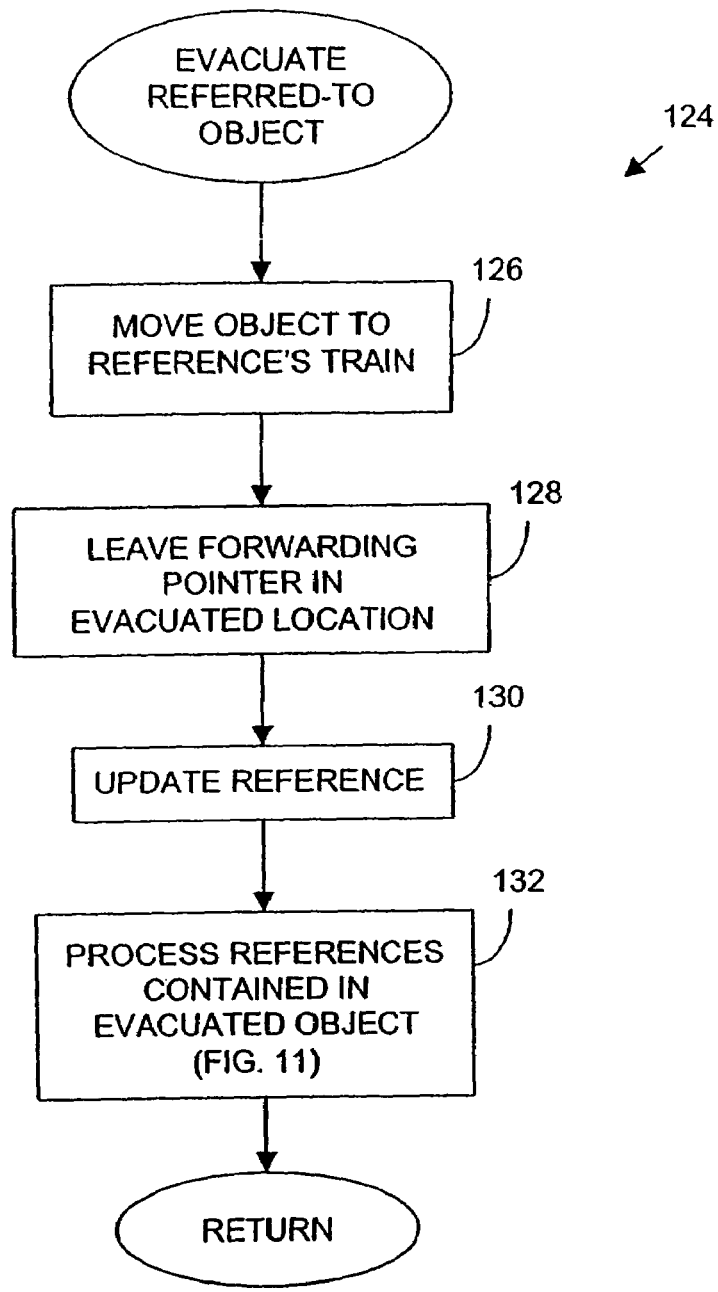
FIG. 10, discussed above, is a block diagram that illustrates in more detail the referred-to-object evacuation that FIG. 9 includes.
Figure 11A:
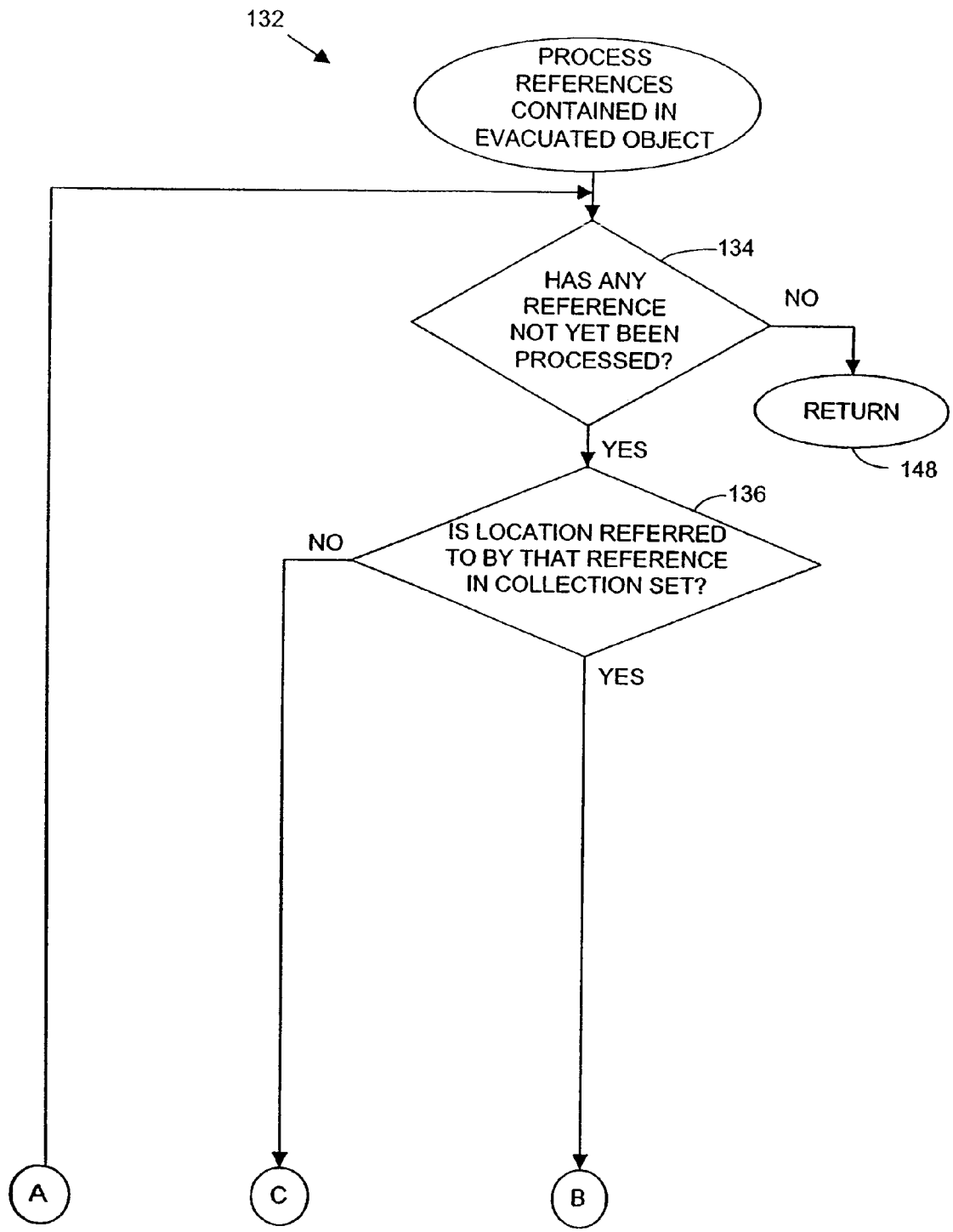
FIGS. 11A and 11B, discussed above, together form a flow chart that illustrates in more detail the FIG. 10 flow chart's step of processing evacuated objects' references.
Figure 11B:
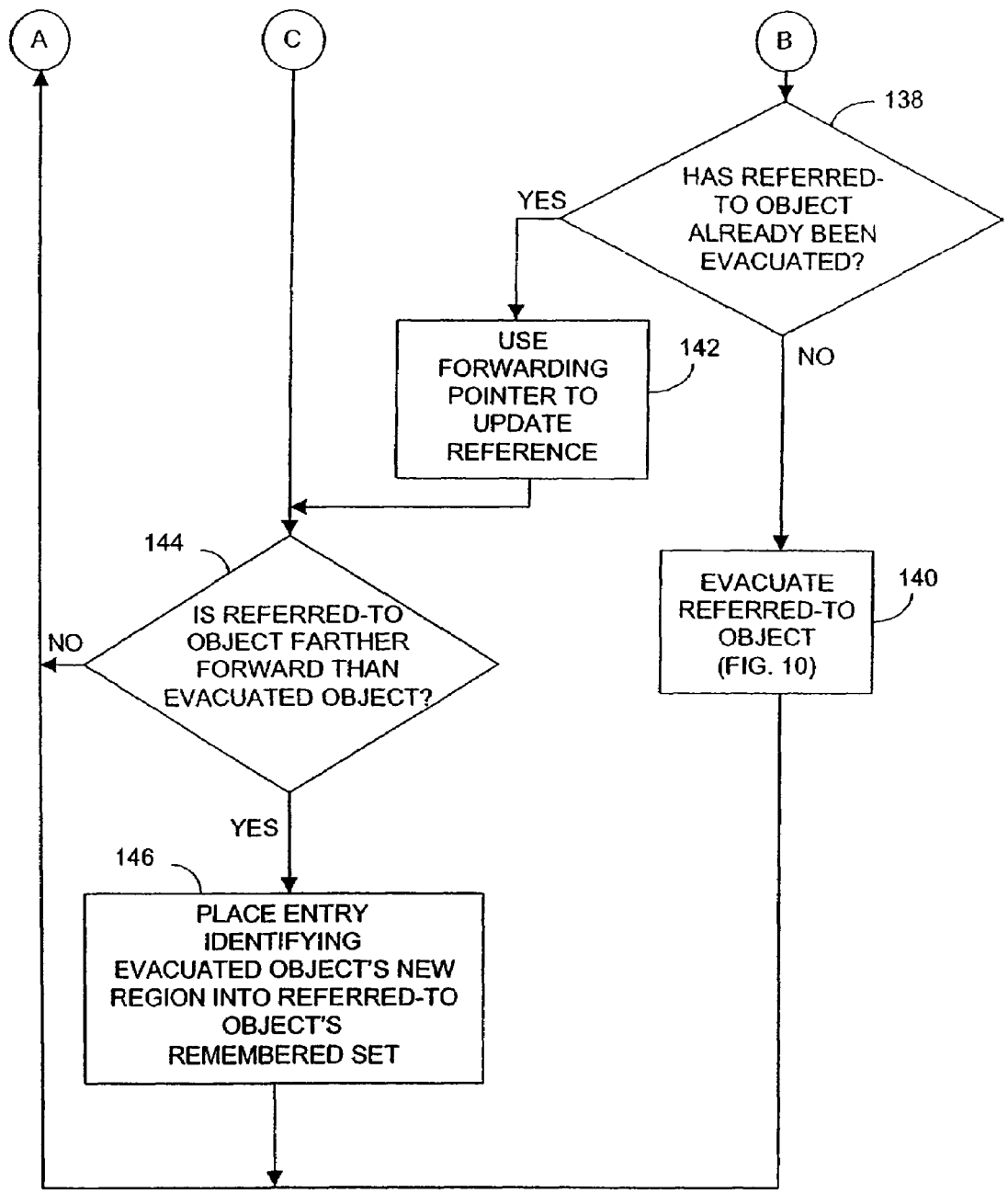
Figure 12A:
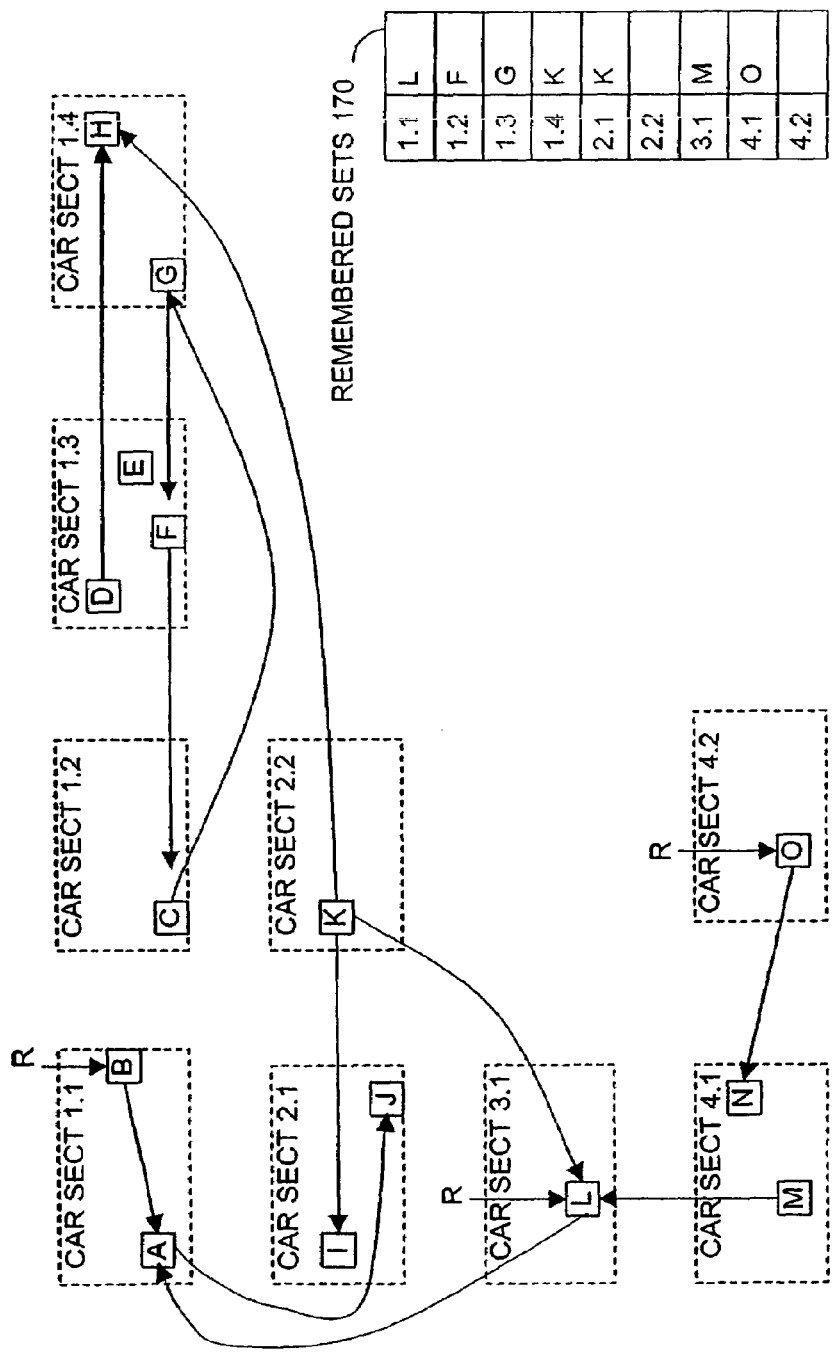
Figure 12B:
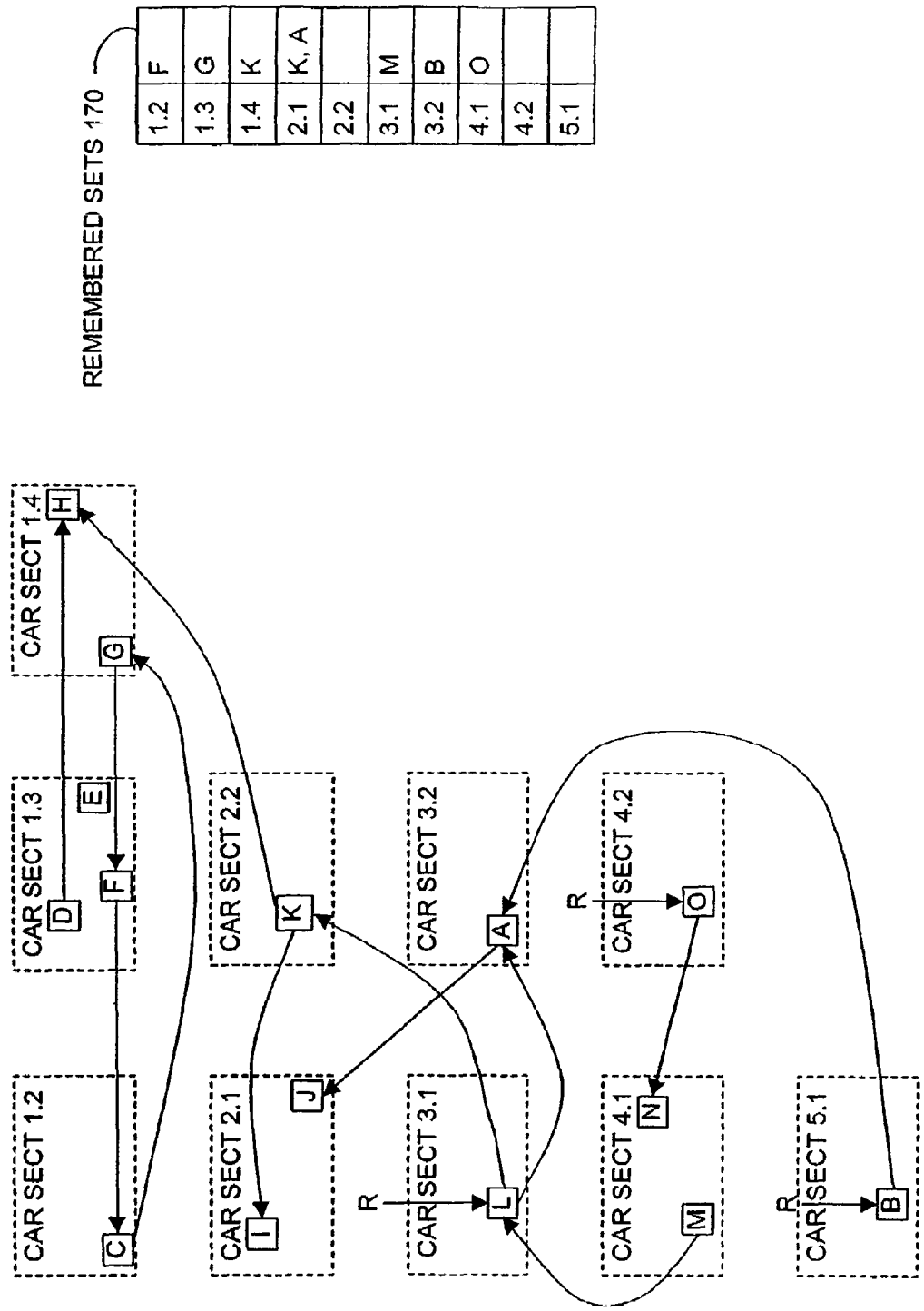
Figure 12C:
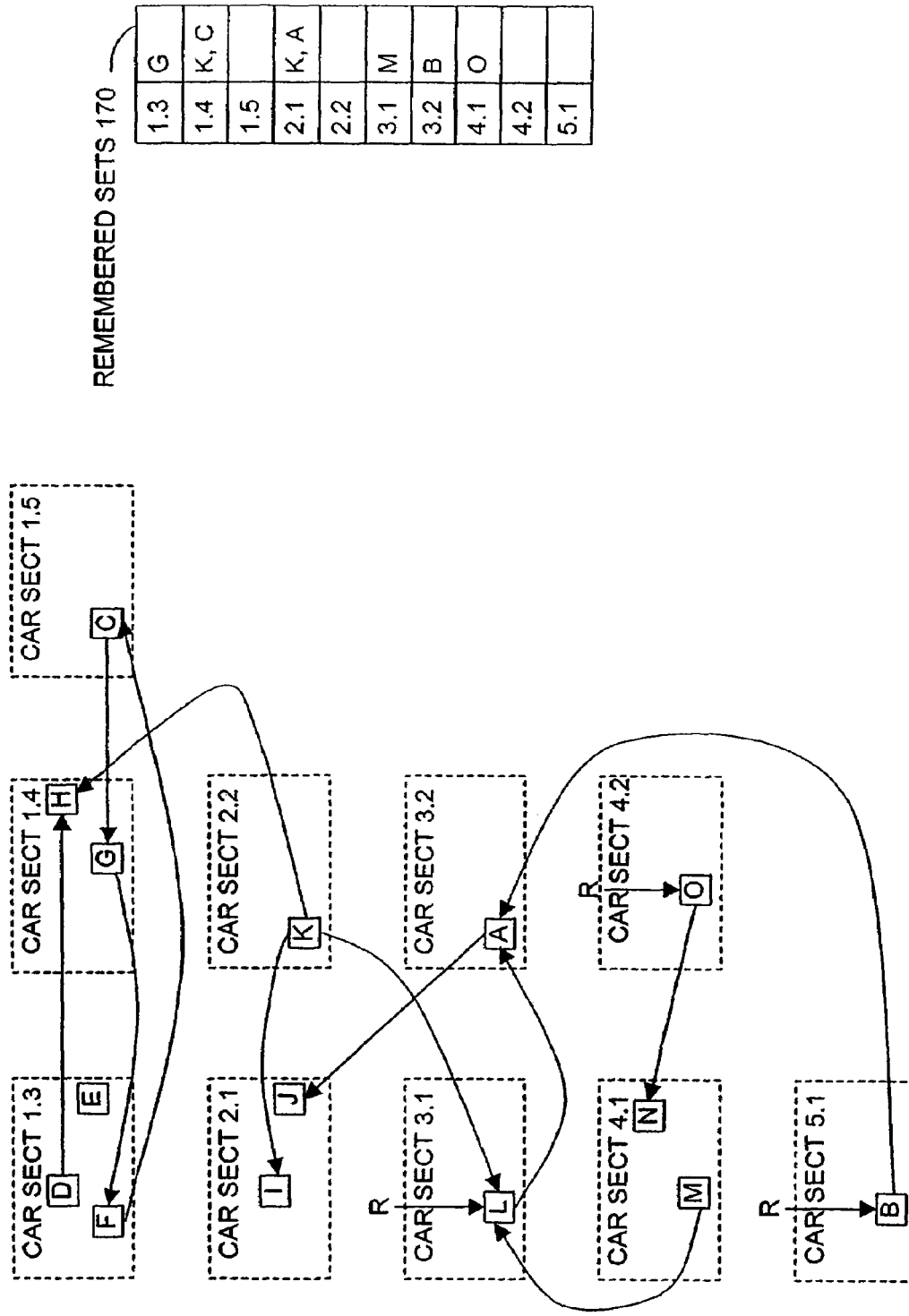
Figure 12D:
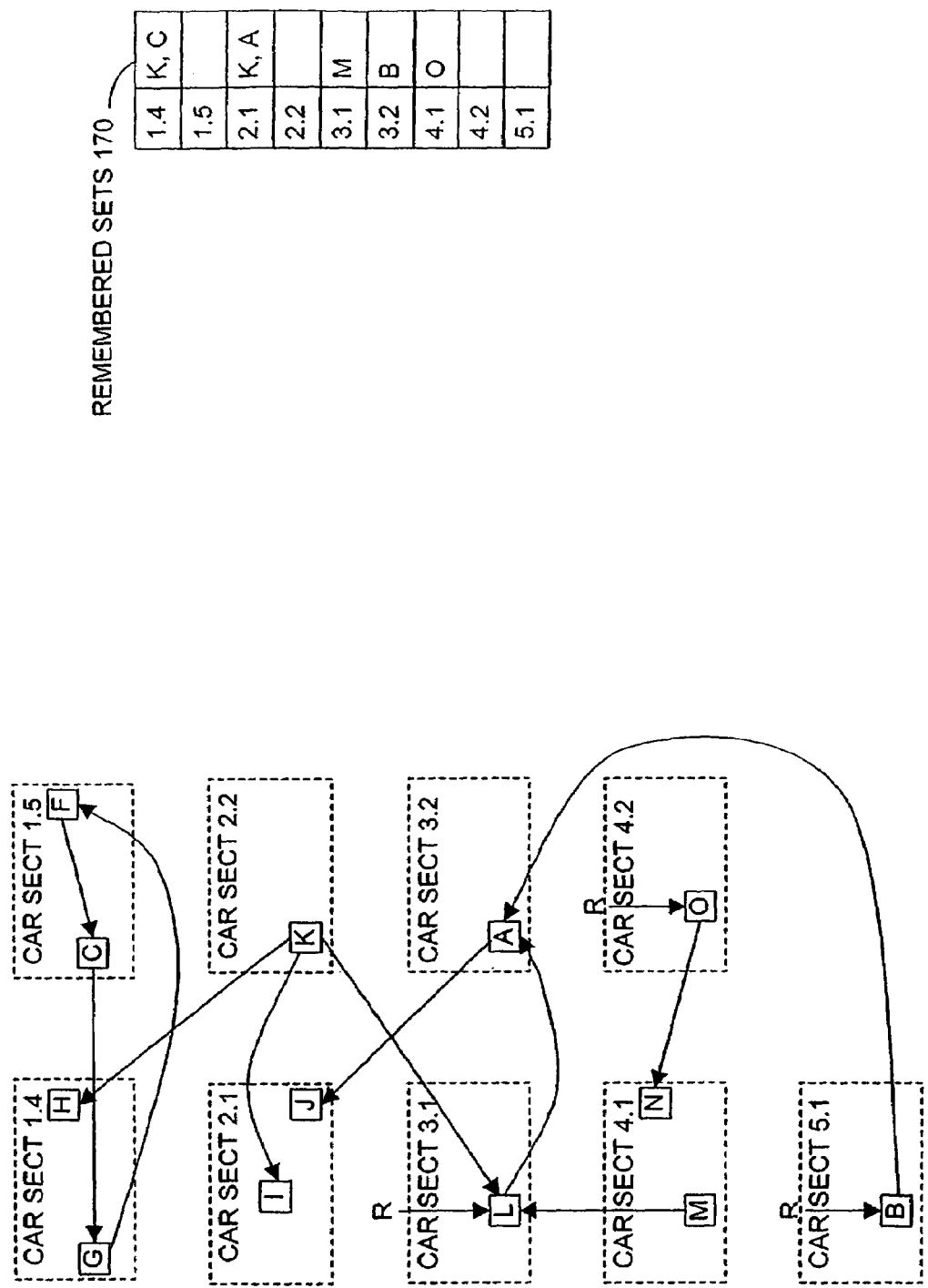
Figure 12E:
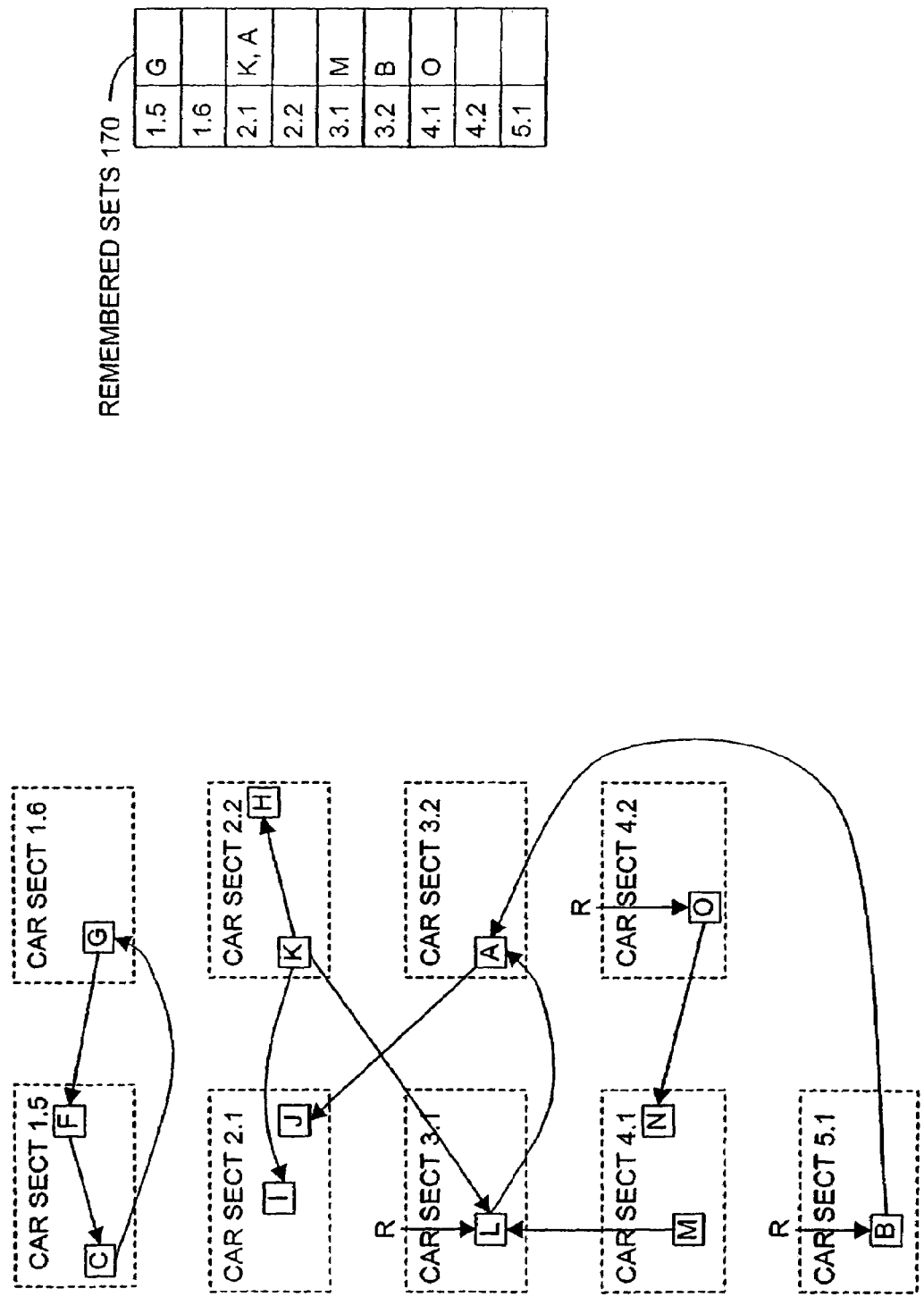
Figure 12G:
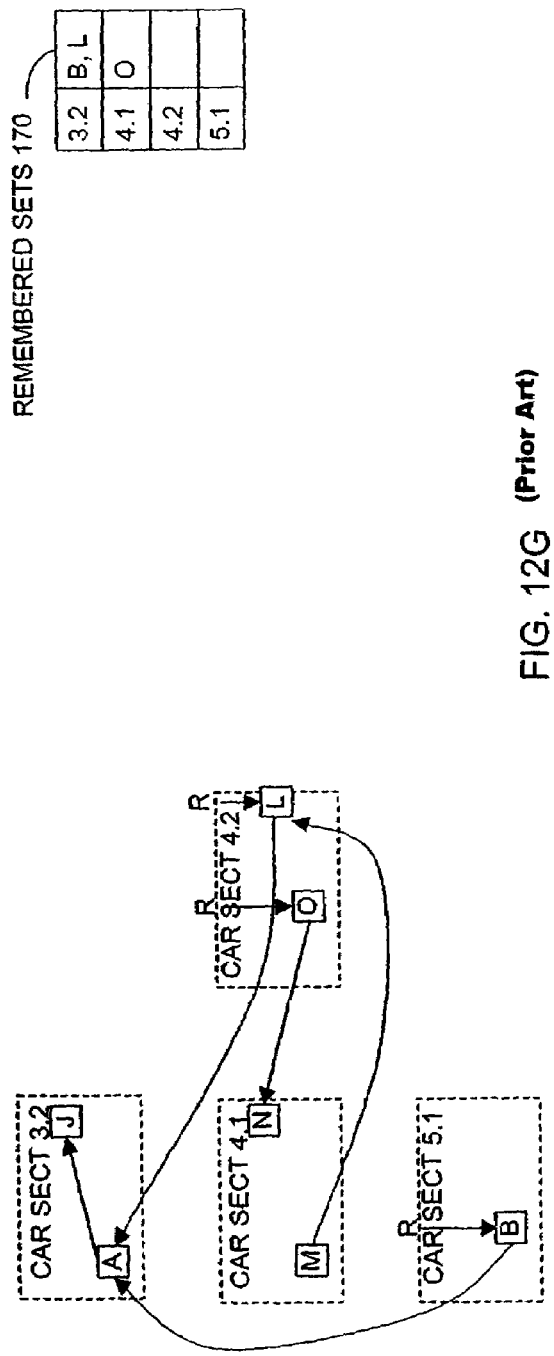
Figure 12H:
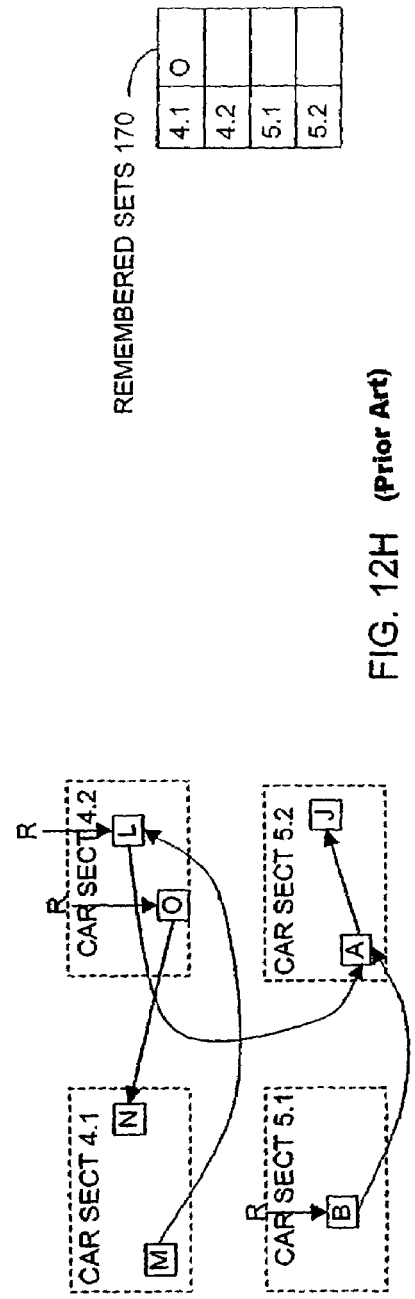
Figure 13A:
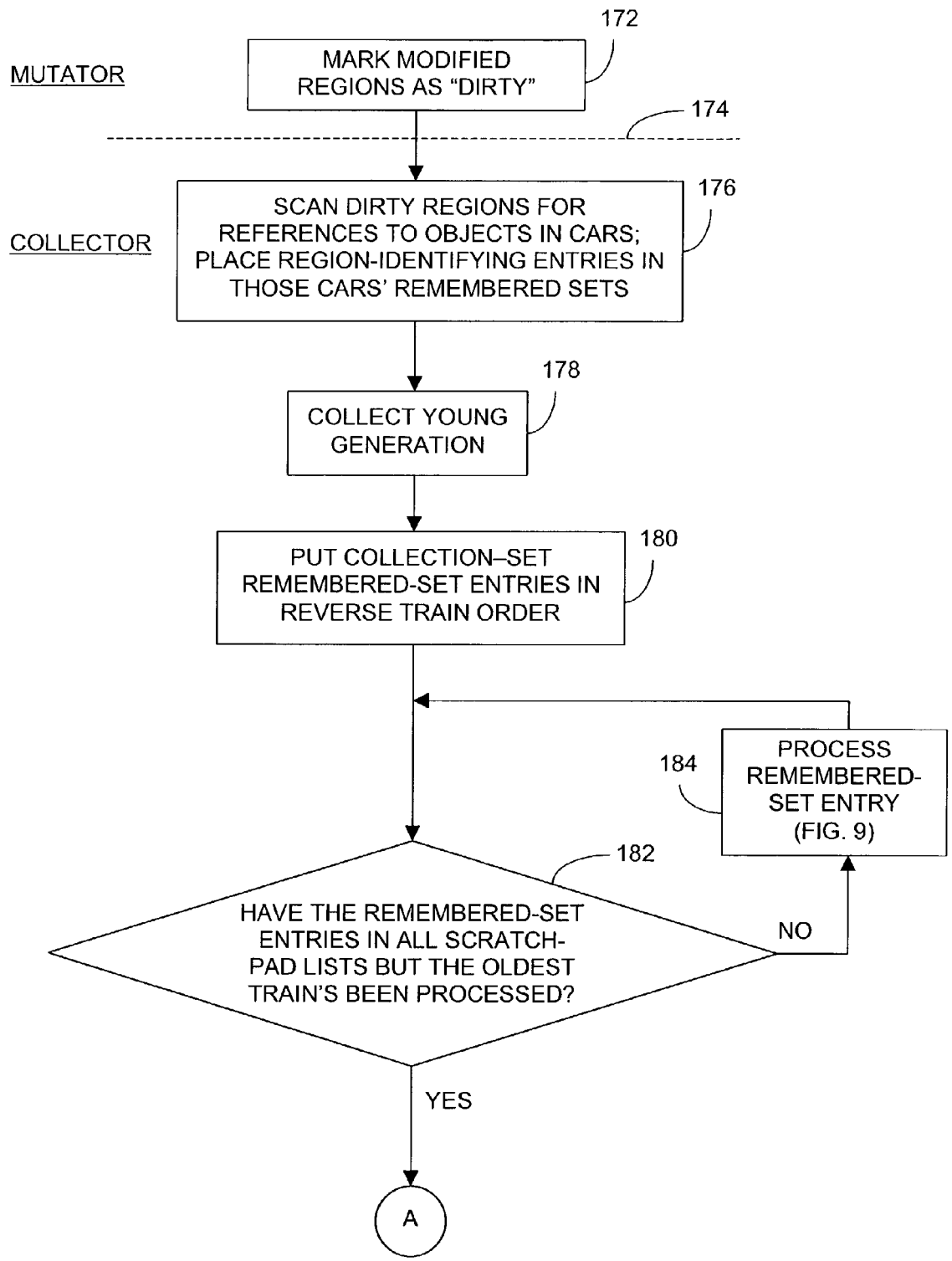
FIGS. 13A and 13B together constitute a flow chart that illustrates a collection interval, as FIGS. 8A and 8B do, but includes optimizations that FIGS. 8A and 8B do not include.
Figure 13B:
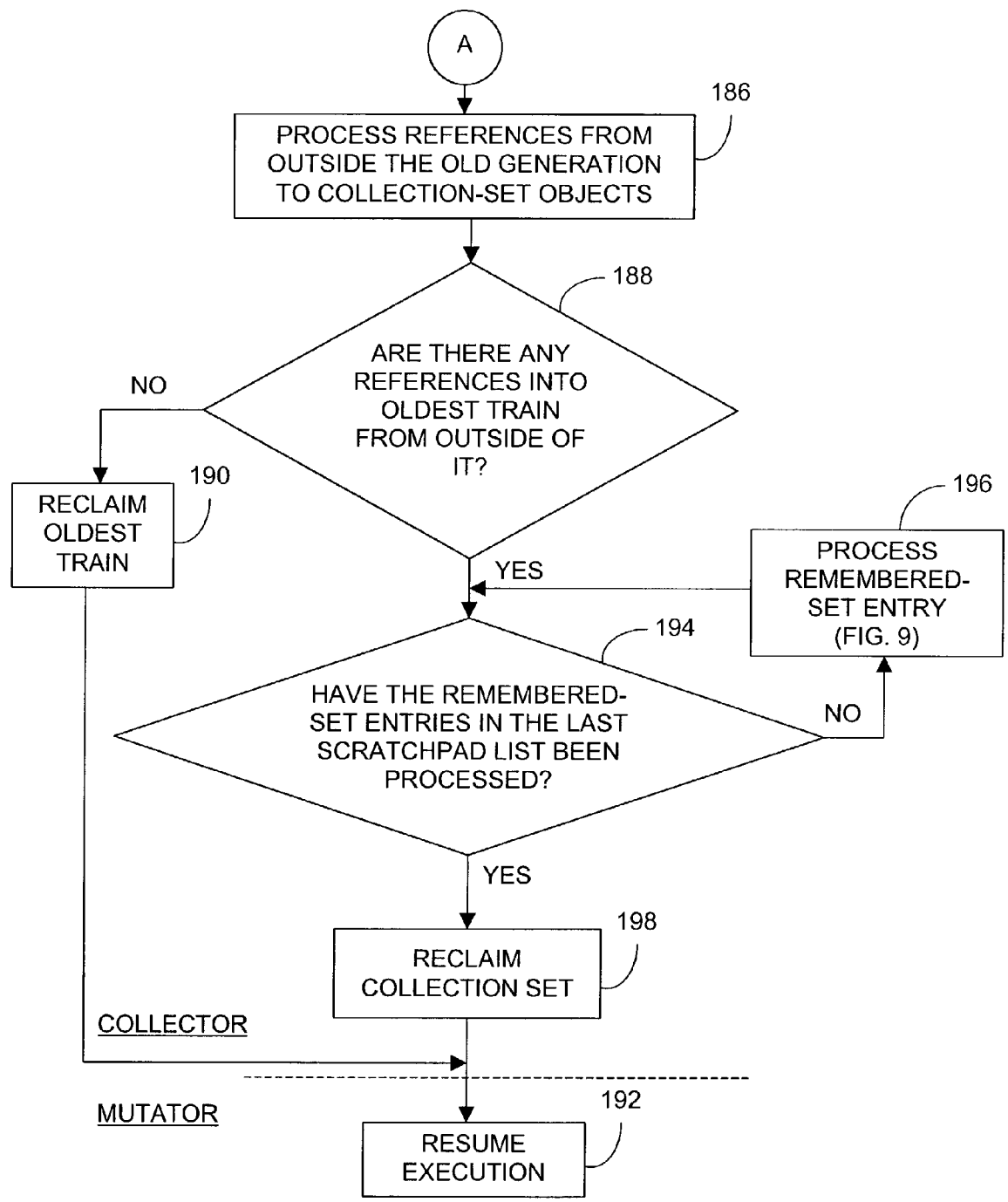

For example, I prefer to employ the present invention's teachings in a collector whose processing sequence is more like the one that FIGS. 13A and 13B (together, "FIG. 13") depict. Those drawings depict a collection operation that is similar to the one that FIG. 8 depicts, but FIG. 13 reflects the possibility of multiple-car collection sets and depicts certain optimizations that some of the invention's embodiments may employ.

Blocks 172, 176, and 178 represent operations that correspond to those that FIG. 8's blocks 102, 106, and 108 do, and dashed line 174 represents the passage of control from the mutator to the collector, as FIG. 8's dashed line 104 does. For the sake of efficiency, though, the collection operation of FIG. 13 includes a step represented by block 180. In this step, the collector reads the remembered set of each car in the collection set to determine the location of each reference into the collection set from a car outside of it. It also places the address of each reference thereby found into one of a plurality of scratch-pad lists associated with respective trains. Usually, the train with which the list is associated is the one that contains that reference. As will be explained in due course, though, embodiments of the present invention that use such scratch-pad lists will sometimes place the reference's address in the scratch-pad list associated with a younger trains. As blocks 182 and 184 indicate, it then processes the entries in all scratch-pad lists but the one associated with the oldest train.

Before the collector processes references in that train's scratch-pad list, the collector evacuates any objects referred to from outside the old generation, as block 186 indicates. To identify such objects, the collector scans the root set. In some generational collectors, it may also have to scan other generations for references into the collection set. For the sake of example, though, we have assumed the particularly common scheme in which a generation's collection in a given interval is always preceded by complete collection of every (in this case, only one) younger generation in the same interval. If, in addition, the collector's promotion policy is to promote all surviving younger-generation objects into older generations, it is necessary only to scan older generations, of which there are none in the example; i.e., some embodiments may not require that the young generation be scanned in the block-186 operation.

For those that do, though, the scanning may actually involve inspecting each surviving object in the young generation, or the collector may expedite the process by using card-table entries. Regardless of which approach it uses, the collector immediately evacuates into another train any collection-set object to which it thereby finds an external reference. The typical policy is to place the evacuated object into the youngest such train. As before, the collector does not attempt to evacuate an object that has already been evacuated, and, when it does evacuate an object to a train, it evacuates to the same train each collection-set object to which a reference in the thus-evacuated object refers. In any case, the collector updates the reference to the evacuated object.

When the inter-generational references into the generation have thus been processed, the garbage collector determines whether there are any references into the oldest train from outside that train. If not, the entire train can be reclaimed, as blocks 188 and 190 indicate.

As block 192 indicates, the collector interval typically ends when a train has thus been collected. If the oldest train cannot be collected in this manner, though, the collector proceeds to evacuate any collection-set objects referred to by references whose locations the oldest train's scratch-pad list includes, as blocks 194 and 196 indicate. It removes them to younger cars in the oldest train, again updating references, avoiding duplicate evacuations, and evacuating any collection-set objects to which the evacuated objects refer. When this process has been completed, the collection set can be reclaimed, as block 198 indicates, since no remaining object is referred to from outside the collection set: any remaining collection-set object is unreachable. The collector then relinquishes control to the mutator.

The present invention's implementation of the train algorithm differs from conventional approaches in that, in some situations, it evacuates a collection-set object to a train that is younger than the youngest train to which a car containing a reference to it belongs. To understand how those situations can arise, consider an embodiment that finds objects that are popular—i.e., that finds objects to which a large number of references refer—and places such popular objects in respective cars that are limited to one object each.

Figure 14:
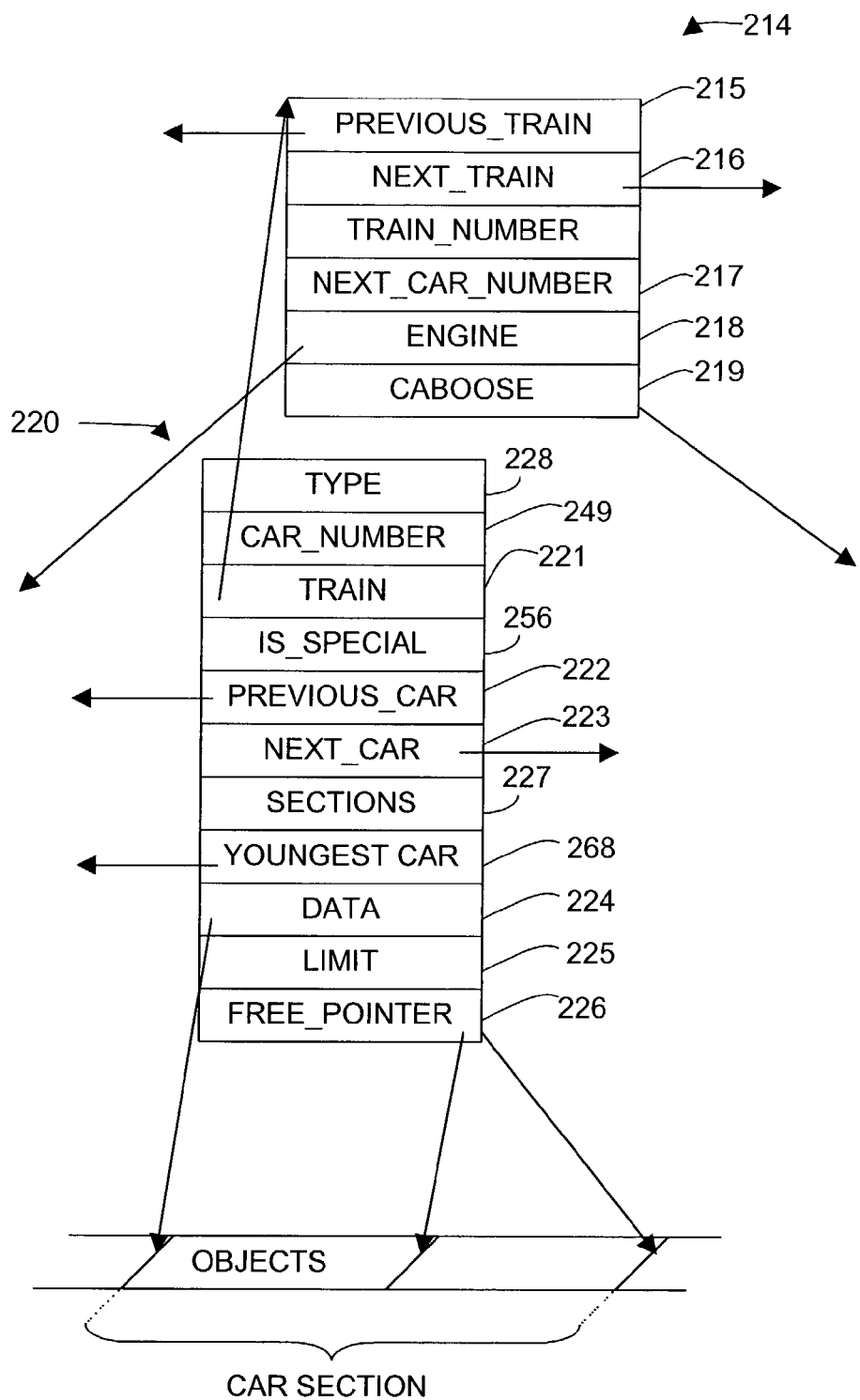
FIG. 14 is a data-structure diagram that depicts data structures of the type that may be used in support of the train algorithm.

To understand one way of doing this, consider FIG. 14's exemplary data structures, which represent the type of information a collector may maintain in support of the train algorithm. To emphasize the ordered nature of the trains, FIG. 14 depicts a train structure 214 as including pointers 215 and 216 to the previous and next trains, although train order could obviously be maintained without such a mechanism. Cars are ordered within trains, too, and it may be convenient to assign numbers for this purpose explicitly and keep the next number to be assigned in the train-associated structure, as field 217 suggests. In any event, some way of associating cars with trains is necessary, and the drawing represents this by fields 218 and 219 that point to structures containing data for the train's first and last cars.

One such structure 220 is depicted as including pointers 221, 222, and 223 to structures that contain information concerning the train to which the car belongs, the previous car in the train, and the next car in the train. Further pointers 224 and 225 point to the locations in the heap at which the associated car section begins and ends, whereas pointer 226 points to the place at which the next object can be added to the car section.

As will be explained in more detail presently, a standard car-section size is used for all cars that contain more than one object, and that size is great enough to contain a relatively large number of average-sized objects. But some objects can be too big for the standard size, so a car section may consist of more than one of the standard-size memory sections. Structure 220 therefore includes a field 227 that indicates how many standard-size memory sections there are in the car section that the structure manages—if the structure manages only a single car.

Figure 15:
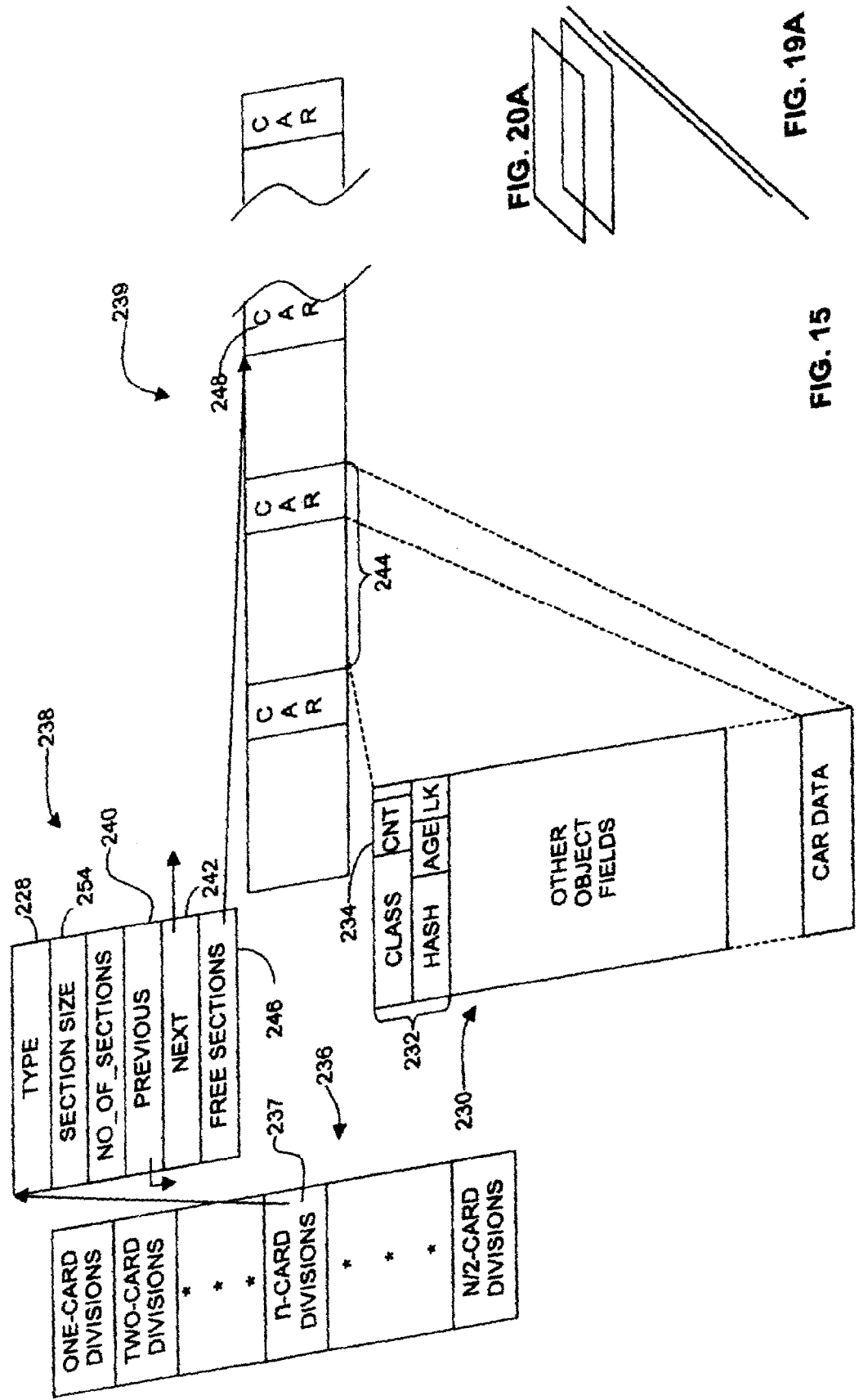
FIG. 15 is a further data-structure diagram depicting a way in which special-sized one-object car sections may be provided.

In the illustrated embodiment, that structure may instead manage a memory section that contains more than one (special-size) car section. When an organization of this type is used, one way of implementing the present invention involves including in structures like structure 220 a field 228 that indicates whether the heap space associated with the structure is used (1) normally, as a car section that can contain multiple objects, or (2) specially, as a region in which objects are stored one to a car in a manner that will now be explained by reference to the additional structures that FIG. 15 illustrates.

To deal specially with popular objects, the garbage collector may keep track of the number of references there are to each object in the generation being collected. Now, the memory space 230 allocated to an object typically begins with a header 232 that contains various housekeeping information, such as an identifier of the class to which the object belongs. To keep track of an object's popularity, the header can include a reference-count field 234. When the garbage collector locates references into the collection set during the collection increment by processing the collection-set cars' remembered sets, it increments the reference-count field in the header of each collection-set object to which it finds a reference. Each time it does so, it tests the resultant value to determine whether the count exceeds a predetermined popular-object threshold. If the count does exceed that threshold, the collector removes the object to a "popular object sideyard" if it has not done so already.

Specifically, the collector consults a table 236, which points to linked lists of normal-car-section-sized regions intended to contain popular objects. Preferably, the normal car-section size is considerably larger than the 30 to 60 bytes that has been shown by studies to be an average object size in typical programs. Under such circumstances, it would be a significant waste of space to allocate a whole normal-sized car section to an individual object. For reasons that will become apparent below, the illustrated embodiment places each popular object into its own, single-car section. So the normal-car-section-sized regions to which table 236 points are to be treated as specially divided into car sections whose sizes are more appropriate to individual-object storage.

To this end, table 236 includes a list of pointers to linked lists of structures associated with respective regions of that type. Each list is associated with a different object-size range. For example, consider the linked list pointed to by table 236's section pointer 237. Pointer 237 is associated with a linked list of normal-car-sized regions organized into n-card car sections. Structure 238 is associated with one such region and includes fields 240 and 242 that point to the previous and next structures in a linked list of such structures associated with respective regions of n-card car sections. Car-section region 239, with which structure 238 is associated, is divided into n-card car sections such as section 244, which contains object 230.

More specifically, the garbage collector determines the size of the newly popular object by, for instance, consulting the class structure to which one of its header entries points. It then determines the smallest popular-car-section size that can contain the object. Having thus identified the appropriate size, it follows table 236's pointer associated with that size to the list of structures associated with regions so divided. It follows the list to the first structure associated with a region that has constituent car sections left.

Let us suppose that the first such structure is structure 238. In that case, the collector finds the next free car section by following pointer 246 to a car data structure 248. This data structure is similar to FIG. 14's structure 220, but in the illustrated embodiment it is located in the garbage-collected heap, at the end of the car section with which it is associated. In a structure—248 field similar to structure 220's field 249 (FIG. 14), the collector places the next car number of the train to which the object is to be assigned, and it places the train's number in a field corresponding to structure 220's field 221. The collector also stores the object at the start of the popular-object car section in which single-car data structure 248 is located. In short, the collector is adding a new car to the object's ar data structure 248 is located. In short, the collector is adding a new car to the object's train, but the associated car section is a smaller-than-usual car section, sized to contain the newly popular object efficiently.

The aspect of the illustrated embodiment's data-structure organization that FIGS. 14 and 15 depict provides for special-size car sections without detracting from rapid identification of the normal-sized car to which a given object belongs. Conventionally, all car sections have been the same size, because doing so facilitates rapid car identification. Typically, for example, the most-significant bits of the difference between the generation's base address and an object's address are used as an offset into a car-metadata table, which contains pointers to car structures associated with the (necessarily uniform-size) memory sections associated with those most-significant bits. FIGS. 14 and 15's organization permits this general approach to be used while providing at the same time for special-sized car sections. The car-metadata table can be used as before to contain pointers to structures associated with memory sections whose uniform size is dictated by the number of address bits used as an index into that table.

In the illustrated embodiment, though, the structures pointed to by the metadata-table pointers contain fields exemplified by fields 228 of FIG. 14's structure 220 and FIG. 15's structure 238. These fields indicate whether the structure manages only a single car section, as structure 220 does. If so, the structure thereby found is the car structure for that object. Otherwise, the collector infers from the object's address and the structure's section_size field 254 the location of the car structure, such as structure 248, that manages the object's special-size car section, and it reads the object's car number from that structure. This inference is readily drawn if every such car structure is positioned at the same offset from one of its respective car section's boundaries. In the illustrated example, for instance, every such car section's car structure is placed at the end of the car section, so its train and car-number fields are known to be located at predetermined offsets from the end of the car section.

Figure 16:
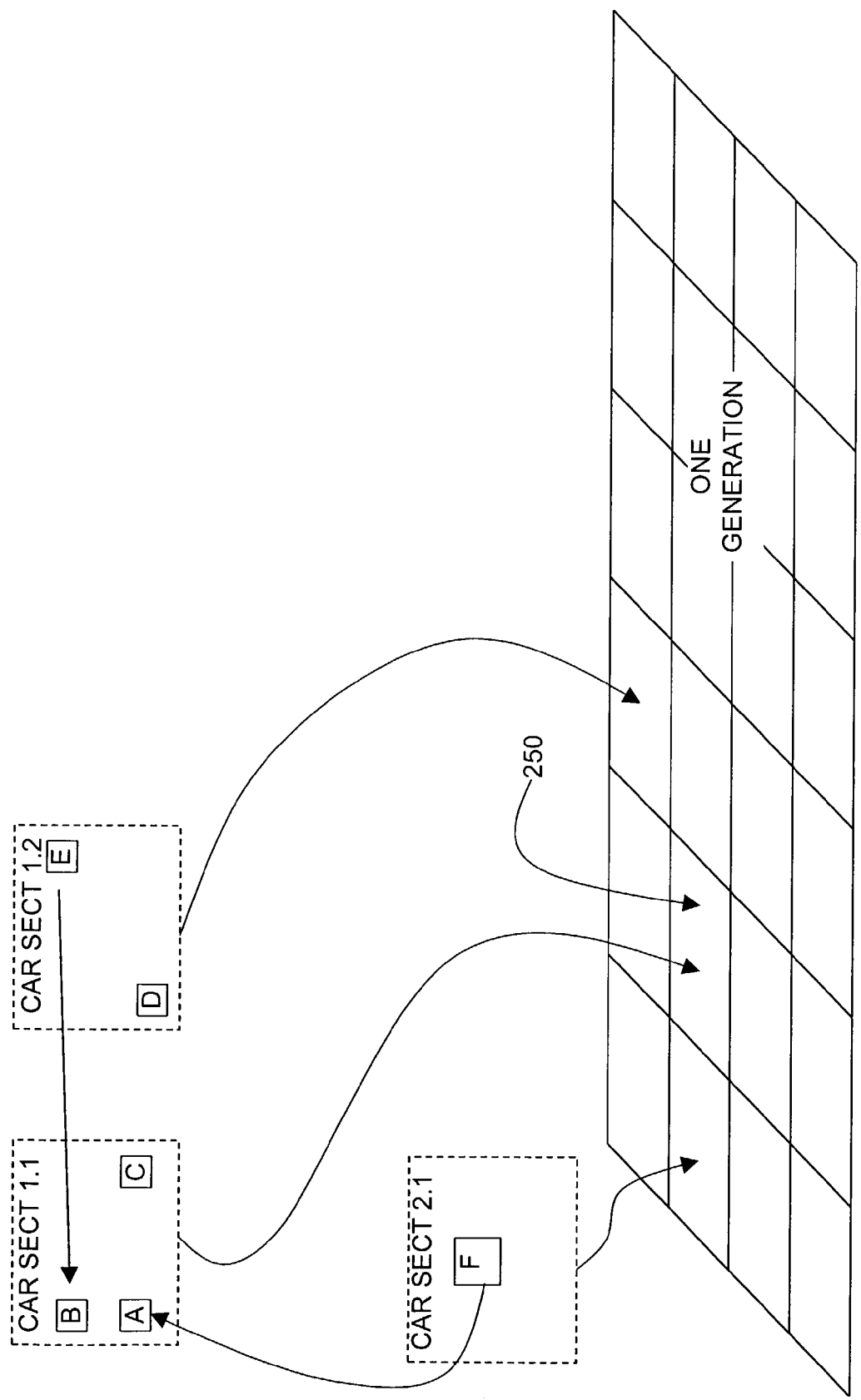
FIG. 16 is a data-structure diagram employed to illustrate conventional train-algorithm object relocation.

To appreciate the effect that allocating popular objects to individual cars can have, consider the process of evacuating FIG. 16's object A from car 1.1 during the collection of that car. (For consistency with FIGS. 12A–J, the object symbols are again placed inside the car symbols, but, of course, the actual object data reside in the car sections that the car structures specify.)

Figure 17:
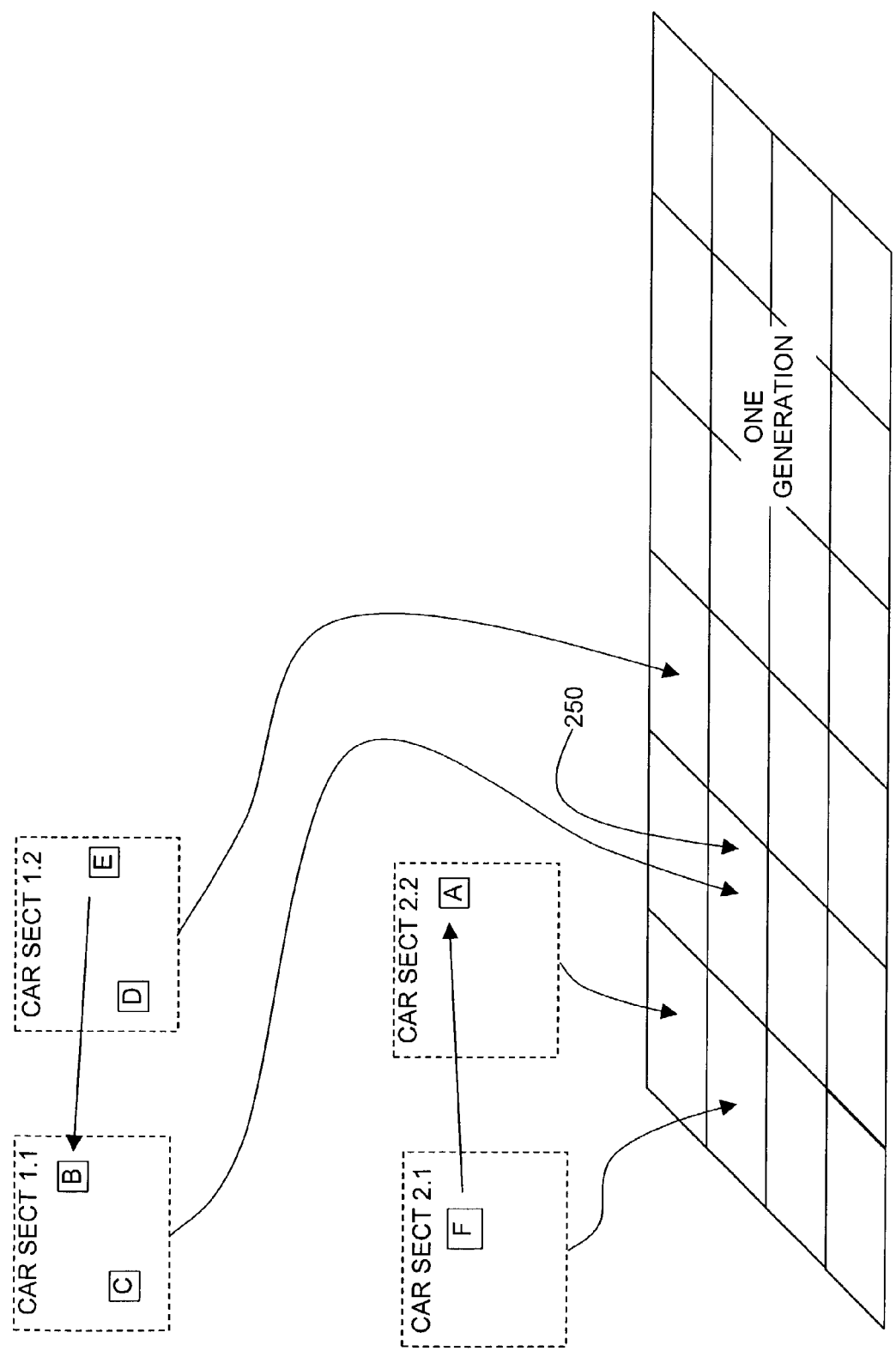
FIG. 17 is another diagram employed to illustrate conventional train-algorithm object relocation.

FIG. 16 depicts object A as being referred to by object F, which resides in a car section associated with car 2.1, i.e. in a train younger than that in which object A resides. The train algorithm therefore requires that object A be evacuated to object F's train. This could be done by moving object A's data into the car section associated with car 2.1. Another alternative, depicted in FIG. 17, is to begin a new car in object F's train and place object A's data in the associated car section. This is the approach conventionally taken when a previous car did not have enough room for the object being copied.

In both cases, a result is that object F's reference to object A needs to be updated; a comparison of FIGS. 16 and 17 reveals that object A is necessarily moved to a different memory-space location. But the actual physical copying—and thus the pointer-update—are necessary in the illustrated case only because the car section 250 associated with object A's previous car 1.1 contains other objects, which will not in general end up in the car that object A newly occupies. In other words, if object A had started the collection increment in its own car and were to end it in its own car, the only operation needed to place object A into a new train would be to relink the car data structures; no reference updates would be necessary. In the illustrated scenario, of course, updating object F's single pointer to object A would typically take less time than re-linking. For popular objects, though, the number of pointers requiring updating can be extremely large, so the benefit of changing car membership solely by relinking is significant.

Figure 18:
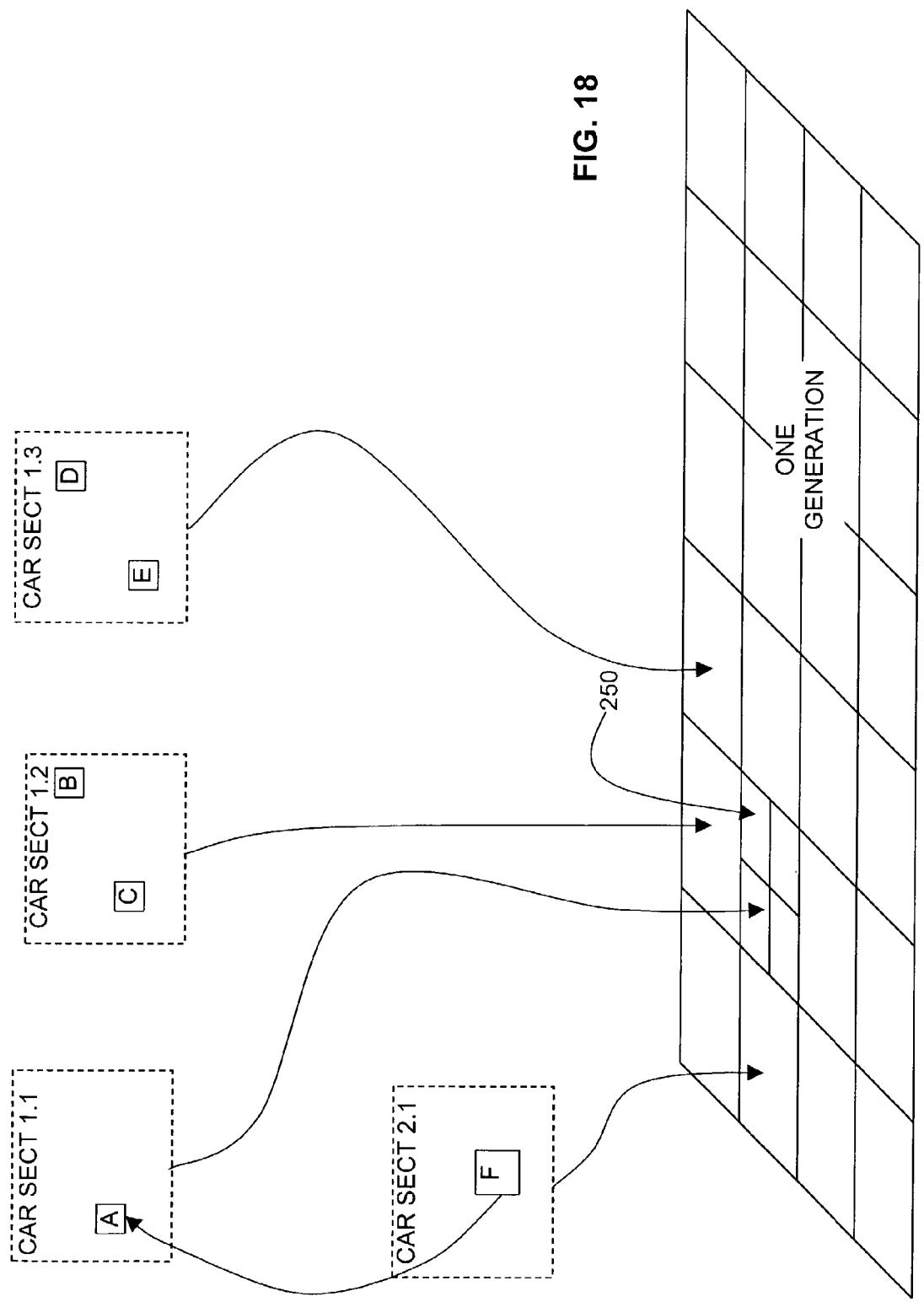
FIG. 18 is a data-structure diagram employed to illustrate evacuation of an object located in a special, single-object car.
Figure 19:
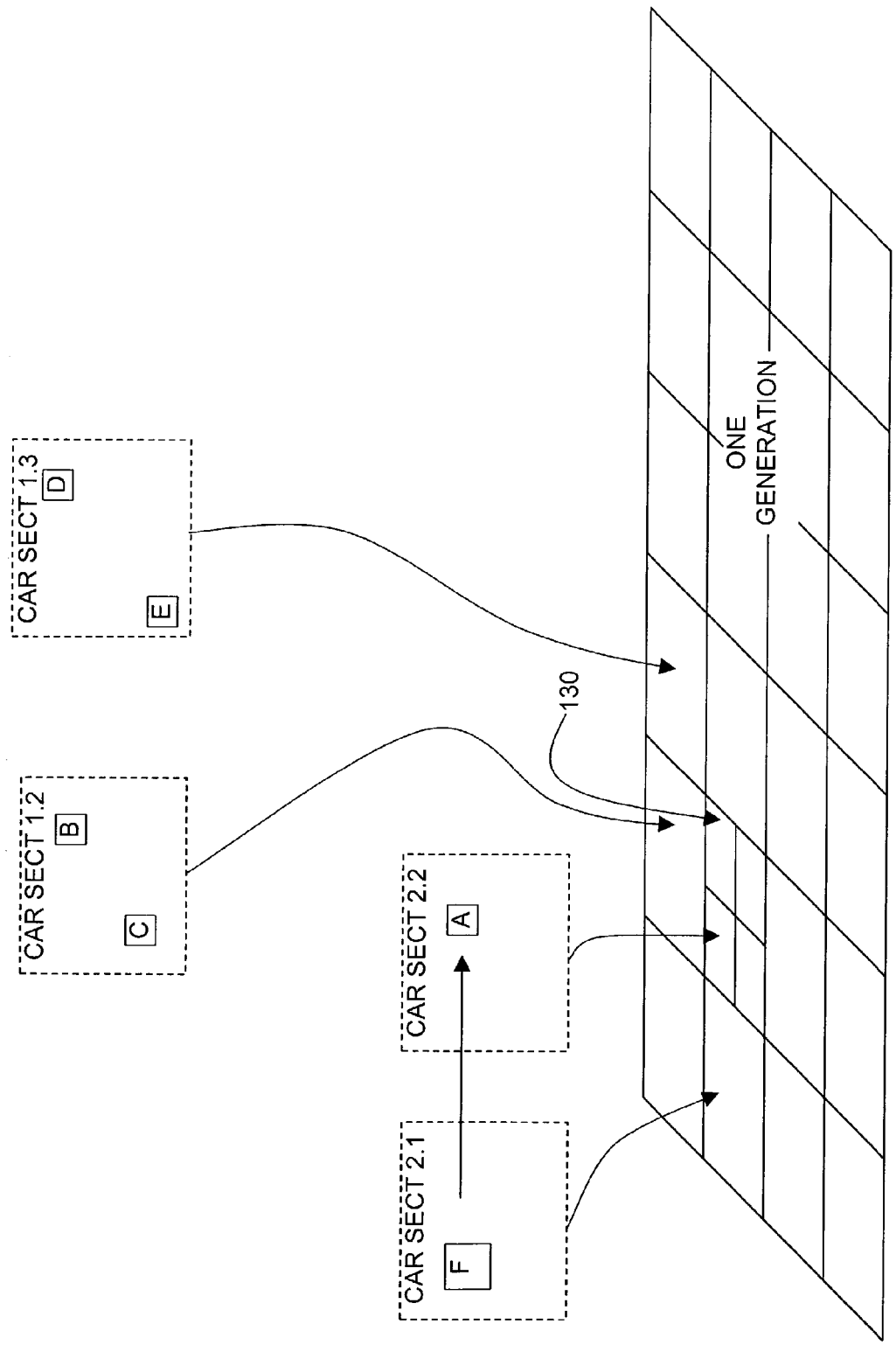
FIG. 19 is a data-structure diagram also used to illustrate evacuation of such an object.

The illustrated embodiment therefore places popular objects in their own cars, as was mentioned above. FIG. 18 illustrates the result of this policy. For the sake of illustration, FIG. 18 shows region 250 as divided into smaller car sections sized to accommodate objects the size of object A. FIG. 19 illustrates moving object A to a new train, but it also indicates that object A remains stored in the same memory-space location. Since object A has not moved, object F's reference to it remains the same, as do all other (not shown) references to object A.

Popular objects are not the only ones whose placement into small, one-object car sections is advantageous. In virtual-machine contexts, for instance, the interface from the virtual machine to so-called native methods, which are not written in the virtual machine's language, must frequently make copies of objects that are subject to relocation by the collector. But the interface can avoid this copying, which can be quite time-consuming in the case of large objects, if it is known that the collector will not relocate the object. An example of a type of object for which this problem can arise frequently is the I/O buffer. Although such buffers are large, normal-size car sections tend to be much larger, so it would be wasteful to dedicate a whole normal-sized car section to an I/O buffer in order to avoid relocation and copying. Also, evacuation by copying takes more operations for larger objects than for smaller ones. Placing larger objects in one-object sections reduces the cost of evacuating them, since it enables the evacuation to be done simply by re-linking, without re-locating.

In the illustrated embodiment, though, such waste is unnecessary, because "oversized" objects can be placed in car sections that are considerably smaller than those used for multiple objects and thereby remain stationary without wasting space excessively. That is, an object can be a relatively small fraction of the normal car-section size in the illustrated embodiment and still be considered oversized. Such an object is stored in a special-size car section, just as a popular object is. However, it is marked as being oversized by, say, placing an appropriate entry in its car-structure field corresponding to FIG. 14's field 256. For instance, that field may be provided as a four-byte field, with one of the bytes indicating whether the object is oversized and others indicating whether it is popular and whether it has only recently become so. (There are reasons not relevant to the present discussion why it may be convenient to distinguish newly popular objects from other popular objects.)

An oversized object thus placed in a special-sized car section is handled largely in the manner described above for popular objects, but an oversized object's reference count is not tested to determine whether the object will remain in the special car section; an object that starts out oversized remains oversized.

As will become apparent, the present invention's teachings are not limited to collectors that specially mark single-object cars in the manner just described. However, its teachings are particularly well suited to collectors that do in some fashion mark cars whose contents will be limited to respective single objects. According to the present invention, the train to which the presence outside the collection set of a reference to a collection-set object causes that object to be evacuated will not always be the same train as that reference's. It may instead be a younger train, one from which the object containing the reference is referred to. Preferably, this is done only if the object containing the reference is located in a car that contains no other object. In the illustrated embodiment, at least some such cars are marked as special cars. The routine depicted in FIG. 20 takes advantage of such marking.

That routine is one that can be used in implementing the step represented by FIG. 13's block 182. In that step, the collector processes each remembered-set entry by determining whether a reference into the collection set still resides in the location that the remembered-set entry identifies. If so, an indicator of that reference's location is placed into a scratch-pad list, normally one that is associated with the train to which the car containing that reference belongs. When the entire remembered set has been processed in this fashion, the collector then proceeds through the scratch-pad lists, beginning with the one associated with the youngest train, and evacuates into those trains the objects referred to from them. As was mentioned above, thus proceeding in reverse-age order tends to minimize evacuation costs.

Figure 20:
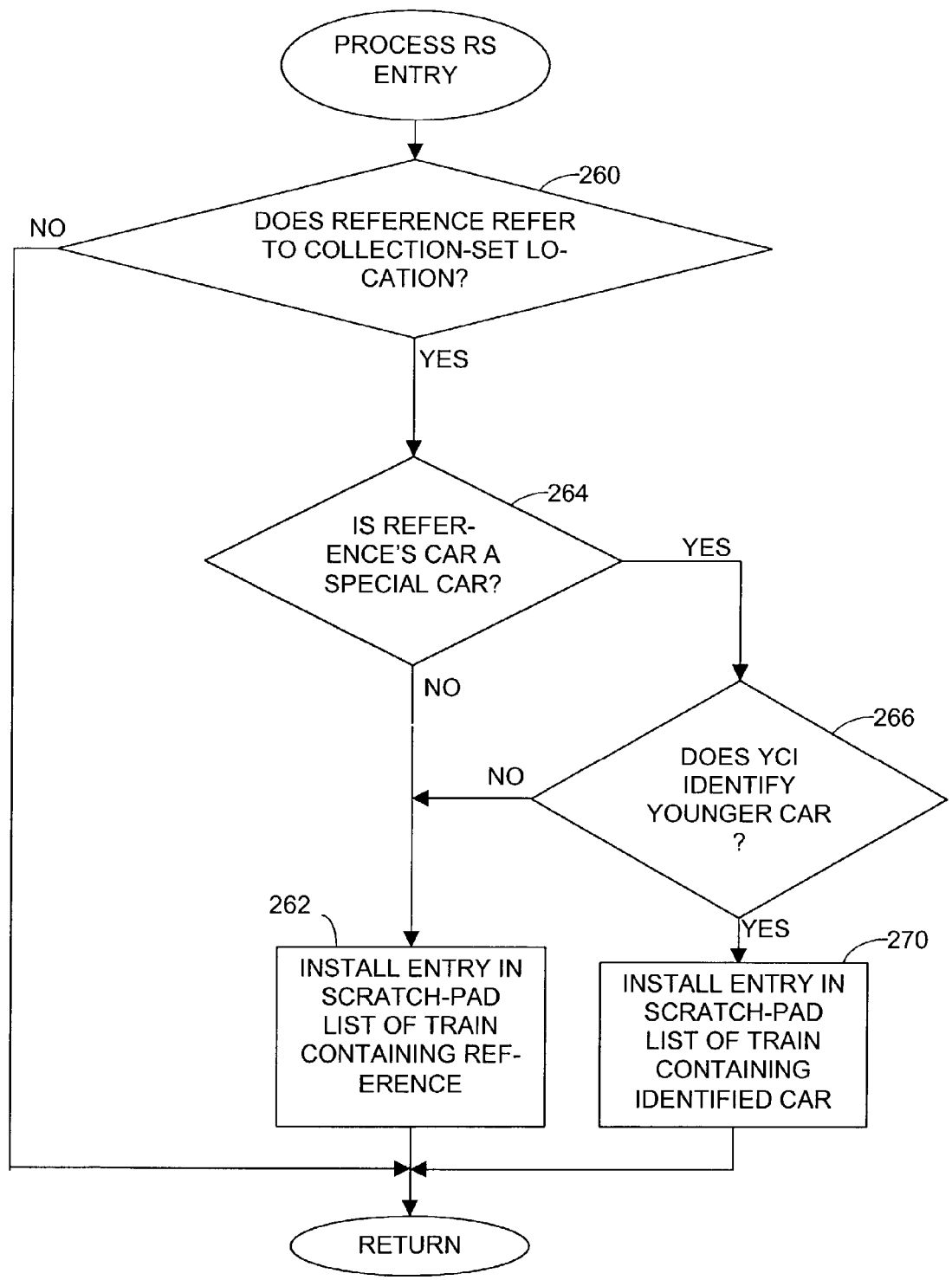
FIG. 20 is a flowchart of a routine for processing a collection set's remembered-set entries in a way that one embodiment of the present-invention employs.

By using FIG. 20's routine for remembered-set processing, the illustrated embodiment achieves further economy.

FIG. 20's block 260 represents the usual step of determining whether the location that the remembered-set entry identifies contains a reference to a collection-set object. Now, some embodiments will sometimes employ remembered-set entries that specify reference locations with a granularity coarse enough that the identified location can contain more than one reference. The present invention's teachings are applicable to such collectors. For the sake of explanation, though, the routine of FIG. 20 is based on the simplifying assumption that all remembered-set entries represent only single-word locations: each remembered-set entry is assumed to represent the location of at most one reference. So the operation represented by block 260 simply determines whether the (single-word) location contains a reference to an object in the collection set. If it does not, then that remembered-set entry's processing is finished, as the flowchart indicates.

If the reference does refer to an object in the collection set, the collector ordinarily places an entry representing the reference's location into the scratch-pad list associated with the train to which the car containing the reference belongs, as block 262 indicates. In the illustrated embodiment, this will result in the referred-to object's being evacuated into a car that belongs to that train, and this is a conventional train-algorithm result.

In accordance with the present invention, though, the referred-to object may instead be evacuated to a car in a younger train. Specifically, it may be evacuated to a train that contains a car from which the object containing the reference is referred to: the object can be thought of as being "relayed" from the reference-containing train to the train from which the reference is referred to. The economy of proceeding in this fashion is apparent: by evacuating the referred-to object directly to a car in that younger train rather than to a car in the train containing the reference that the remembered set identifies, the collector avoids the expense of the evacuation that would otherwise become necessary in a subsequent collection increment, in which the collector collects the car containing the reference that the current remembered-set entry identifies.

Ordinarily, though, the savings in evacuation cost would be compromised by the expense of finding that younger train: to find the youngest train, if any, from which the object containing the reference is referred to, the collector would need to scan all locations identified by remembered-set entries in the remembered set associated with the car that contains the reference. To avoid this, the illustrated embodiment imposes a relay criterion indicative of a less-than-normal expense. In the illustrated embodiment, this criterion establishes that the reference-containing car contains only a single object.

To identify some such cars, the illustrated embodiment performs the test that block 264 represents: it determines whether the car containing the reference is a special car, i.e., a car that the collector prevents from receiving more than a single object. As was explained above, the collector can infer from the most-significant bits of the reference's address the location of the data structure, exemplified by FIG. 14's data structure 220, that is associated with the standard-car-section-sized region in which the reference is located. If that structure's is_special field 258 indicates that the region associated with that structure is used as a normal car section, which can contain more than one object, then the test represented by FIG. 20's block 264 yields a negative result, and the referred-to object is simply placed into a car that belongs to the train to which the train containing the reference belongs.

On the other hand, if field 258 indicates that the region with which it is associated is part of an oversized car or is dedicated to special car sections, which can contain at most one object apiece, the collector proceeds to a step represented by a block 266. In that step the collector determines whether it is likely that the object containing the reference is referred to from a younger car.

Specifically, it consults a youngest-car indicator. As FIG. 14's field 268 indicates, the youngest-car indicator may be stored in the metadata structure for that car section. That field identifies the youngest car where a reference has been found to an object in the car with which the structure is associated. Whenever a new entry is made into the car's remembered set, the collection-sequence position of the car thereby identified is compared with that of the car containing the location represented by the youngest-car indicator. If the new entry represents a location in a younger car, the youngest-car indicator is updated.

If the car containing the reference processed in the FIG. 20 routine is a special car, the special car's youngest-car indicator identifies the youngest car from which the object containing the reference being processed in the FIG. 20 routine is referred to, since that object is the sole object in the car. This means that, in the collection increment in which the car containing the reference is collected, the object containing the reference will probably have to be evacuated to the train to which the car identified by the youngest-car indicator belongs. If, as is conventional, the referred-to object had been evacuated to the train to which the object containing the reference belongs, then the referred-to object would probably need to be evacuated again, to a car in that younger train. But the illustrated embodiment avoids this. Specifically, it does not place the scratch-pad-list entry for that reference in the list associated with the train to which the car containing the reference belongs. As FIG. 20's block 270 indicates, it instead places it in the scratch-pad list for the train that contains the car identified by the youngest-car indicator associated with the reference's car.

Now, reviewing blocks 262, 266, and 270 reveals that the determining factor is not really whether the reference is referred to from a younger car but rather whether it is referred to from a car in a younger train. In essence, the youngest-car indicator serves as a youngest-train indicator: if the reference is not referred to from a train younger than the reference's train, the referred-to object is evacuated conventionally, i.e., not to a train younger than one from which it is referred to. So some embodiments may use youngest-train indicators that are not additionally youngest-car indicators. But practical considerations will ordinarily result in use of youngest-car indicators as youngest-train indicators.

Once the scratch-pad-list entry has been made, the remembered-set entry's processing is complete, as FIG. 20 indicates.

A review of FIG. 20 reveals that the illustrated routine will install a scratch-pad entry in the train to which the car containing the reference belongs even in some situations in which the car contains only one object and in which that car's youngest-car indicator identifies a car in a younger train: some cars that are not special cars will contain only single objects, and the outcome of the determination represented by FIG. 20's block 264 would be negative. So some embodiments of the invention may use a test that is more comprehensive. Since determining whether a normal car contains only a single object is more expensive than simply determining whether the car is a special car, though, the illustrated embodiment restricts itself to a special-car determination.

Additionally, some embodiments may not employ a youngest-car indicator to find a younger train from which the object containing the reference in question is referred to. But other approaches, such as searching the remembered set of the car containing the reference in question, tend to be more expensive. And the youngest-car indicator will often be essentially cost-free, since it will often be provided anyway for other purposes.

As can be appreciated from the foregoing description, the present invention enables a collector to reduce evacuation cost significantly. It therefore constitutes a significant advance in the art.

What is claimed is:

1. A method for employing a computer system, which includes memory, to perform garbage collection, the method comprising:
   A) treating a generation in the memory as divided into car sections organized into trains that have an oldest-to-youngest order;
   B) collecting the generation in accordance with the train algorithm in collection increments, with which respective collection sets in the generation are associated, by, in at least some of the collection increments:
      i) determining, for each reference that refers to a referred-to object in the collection set and is contained by a containing object located in the generation but outside the collection set, whether that reference satisfies a predetermined set of at least one relay criterion;
      ii) if that reference satisfies the predetermined set of at least one relay criterion, evacuating the referred-to object to a train that is younger than that reference's train and contains a reference to the containing object;
      iii) if that reference does not satisfy the predetermined set of at least one relay criterion, evacuating the referred-to object to that reference's train; and
      iv) reclaiming the collection set.

2. A method as defined in claim 1 wherein a reference satisfies the predetermined set of at least one relay criterion only if that reference is located in a car containing no other object.

3. A method as defined in claim 1 wherein:
   C) the method further includes:
      i) designating at least one car a special car; and
      ii) limiting the contents of each special car to a single object; and
   D) a reference satisfies the predetermined set of at least one relay criterion only if the reference is located in a car designated a special car.

4. A method as defined in claim 1 wherein:
   C) the method further includes maintaining for each car a youngest-train indicator associated therewith that identifies the youngest train in which a reference to an object in that car has been found, at least if such a reference is located in a train younger than the train to which that car belongs; and
   D) one said relay criterion is that the youngest-train indicator associated with the car in which the containing object is located identifies a car in a train that is younger than the train to which the car containing the containing object belongs.

5. A method as defined in claim 4 wherein the way in which the youngest-train indicator associated with a given car identifies the youngest train in which a reference to an object in that car has been found is to identify the youngest car in which a reference to an object in that car has been found, at least if such a reference is located in a train younger than the train to which that car belongs.

6. A method as defined in claim 4 wherein a reference satisfies the predetermined set of at least one relay criterion only if that reference is located in a car containing no other object.

7. A method as defined in claim 4 wherein:
   E) the method further includes:
      i) designating at least one car a special car; and
      ii) limiting the contents of each special car to a single object; and
   F) a reference satisfies the predetermined set of at least one relay criterion only if the reference is located in a car designated a special car.

8. A computer system that includes memory and comprises:
   A) processor circuitry operable to execute processor instructions;
   B) memory circuitry, to which the processor circuitry is responsive, that contains processor instructions readable by the processor circuitry to configure the computer system as a garbage collector that collects the generation in accordance with the train algorithm in collection increments, with which respective collection sets in the generation are associated, by, in at least some of the collection increments:
      i) determining, for each reference that refers to a referred-to object in the collection set and is contained by a containing object located in the generation but outside the collection set, whether that reference satisfies a predetermined set of at least one relay criterion;
      ii) if that reference satisfies the predetermined set of at least one relay criterion, evacuating the referred-to object to a train that is younger than that reference's train and contains a reference to the containing object;
      iii) if that reference does not satisfy the predetermined set of at least one relay criterion, evacuating the referred-to object to that reference's train; and
      iv) reclaiming the collection set.

9. A computer system as defined in claim 8 wherein a reference satisfies the predetermined set of at least one relay criterion only if that reference is located in a car containing no other object.

10. A computer system as defined in claim 8 wherein:
    C) the garbage collector further:
       i) designates at least one car a special car; and
       ii) limits the contents of each special car to a single object; and
    D) a reference satisfies the predetermined set of at least one relay criterion only if the reference is located in a car designated a special car.

11. A computer system as defined in claim 8 wherein:
    C) the garbage collector additionally maintains for each car a youngest-train indicator associated therewith that identifies the youngest train in which a reference to an object in that car has been found, at least if such a reference is located in a train younger than the train to which that car belongs; and
    D) one said relay criterion is that the youngest-train indicator associated with the car in which the containing object is located identifies a car in a train that is younger than the train to which the car containing the containing object belongs.

12. A computer system as defined in claim 11 wherein the way in which the youngest-train indicator associated with a given car identifies the youngest train in which a reference to an object in that car has been found is to identify the youngest car in which a reference to an object in that car has been found, at least if such a reference is located in a train younger than the train to which that car belongs.

13. A computer system as defined in claim 11 wherein a reference satisfies the predetermined set of at least one relay criterion only if that reference is located in a car containing no other object.

14. A computer system as defined in claim 11 wherein:
   E) the garbage collector further:
      i) designates at least one car a special car; and
      ii) limits the contents of each special car to a single object; and
   F) a reference satisfies the predetermined set of at least one relay criterion only if the reference is located in a car designated a special car.

15. A storage medium containing instructions readable by a computer system including memory to configure the computer system to operate as a garbage collector that:
   A) treats a generation in the memory as divided into car sections organized into trains that have an oldest-to-youngest order; and
   B) collects the generation in accordance with the train algorithm in collection increments, with which respective collection sets in the generation are associated, by, in at least some of the collection increments:
      i) determining, for each reference that refers to a referred-to object in the collection set and is contained by a containing object located in the generation but outside the collection set, whether that reference satisfies a predetermined set of at least one relay criterion;
      ii) if that reference satisfies the predetermined set of at least one relay criterion, evacuating the referred-to object to a train that is younger than that reference's train and contains a reference to the containing object;
      iii) if that reference does not satisfy the predetermined set of at least one relay criterion, evacuating the referred-to object to that reference's train; and
      iv) reclaiming the collection set.

16. A storage medium as defined in claim 15 wherein a reference satisfies the predetermined set of at least one relay criterion only if that reference is located in a car containing no other object.

17. A storage medium as defined in claim 15 wherein:
   C) the garbage collector further:
      i) designates at least one car a special car; and
      ii) limits the contents of each special car to a single object; and
   D) a reference satisfies the predetermined set of at least one relay criterion only if the reference is located in a car designated a special car.

18. A storage medium as defined in claim 15 wherein:
   C) the garbage collector additionally maintains for each car a youngest-train indicator associated therewith that identifies the youngest train in which a reference to an object in that car has been found, at least if such a reference is located in a train younger than the train to which that car belongs; and
   D) one said relay criterion is that the youngest-train indicator associated with the car in which the containing object is located identifies a car in a train that is younger than the train to which the car containing the containing object belongs.

19. A storage medium as defined in claim 18 wherein the way in which the youngest-train indicator associated with a given car identifies the youngest train in which a reference to an object in that car has been found is to identify the youngest car in which a reference to an object in that car has been found, at least if such a reference is located in a train younger than the train to which that car belongs.

20. A storage medium as defined in claim 18 wherein a reference satisfies the predetermined set of at least one relay criterion only if that reference is located in a car containing no other object.

21. A storage medium as defined in claim 18 wherein:
   E) the garbage collector further:
      i) designates at least one car a special car; and
      ii) limits the contents of each special car to a single object; and
   F) a reference satisfies the predetermined set of at least one relay criterion only if the reference is located in a car designated a special car.

22. A garbage collector operating in the memory of a computer and including:
   A) means for treating a generation in a computer system's memory as divided into car sections organized into trains that have an oldest-to-youngest order; and
   B) means for collecting the generation in accordance with the train algorithm collection increments, with which respective collection sets in the generation, are associated, by, in at least some of the collection increments:
      i) determining, for each reference that refers to a referred-to object in the collection set and is contained by a containing object located in the generation but outside the collection set, whether that reference satisfies a predetermined set of at least one relay criterion;
      ii) if that reference satisfies the predetermined set of at least one relay criterion, evacuating the referred-to object to a train that is younger than that reference's train and contains a reference to the containing object;
      iii) if that reference does not satisfy the predetermined set of at least one relay criterion, evacuating the referred-to object to that reference's train; and
      iv) reclaiming the collection set.

* * * * *